US009584485B2

United States Patent
Arno et al.

(10) Patent No.: US 9,584,485 B2
(45) Date of Patent: Feb. 28, 2017

(54) KEY ENCRYPTION SYSTEM, METHOD, AND NETWORK DEVICES

(71) Applicant: Superna Business Consulting, Inc., Ottawa (CA)

(72) Inventors: Michael William Arno, Ottawa (CA); Andrew MacKay, Carp (CA)

(73) Assignee: Superna Business Consulting, Inc., Kanata (CA)

( * ) Notice: Subject to any disclaimer, the term of this patent is extended or adjusted under 35 U.S.C. 154(b) by 617 days.

(21) Appl. No.: 13/721,813

(22) Filed: Dec. 20, 2012

(65) Prior Publication Data

US 2013/0173909 A1  Jul. 4, 2013

Related U.S. Application Data

(60) Provisional application No. 61/580,730, filed on Dec. 28, 2011.

(51) Int. Cl.
*H04L 9/00* (2006.01)
*H04L 29/06* (2006.01)
*H04L 12/26* (2006.01)
*H04L 12/24* (2006.01)

(52) U.S. Cl.
CPC ........... *H04L 63/04* (2013.01); *H04L 43/0823* (2013.01); *H04L 63/0428* (2013.01); *H04L 63/08* (2013.01); *H04L 41/18* (2013.01)

(58) Field of Classification Search
CPC ..... H04B 10/0771; G07C 5/008; G07C 5/085; H04L 41/18; H04L 43/0823; H04L 63/04; H04L 63/0428; H04L 63/08; H04L 67/125; H04L 67/20
USPC ....................................................... 713/153
See application file for complete search history.

(56) References Cited

U.S. PATENT DOCUMENTS

| | | |
|---|---|---|
| 5,173,938 A | 12/1992 | Steinbrenner et al. |
| 5,301,232 A | 4/1994 | Mulford |
| 5,757,911 A | 5/1998 | Shibata |
| 6,157,723 A | 12/2000 | Schultz |
| 6,442,690 B1 | 8/2002 | Howard, Jr. et al. |
| 7,506,161 B2 | 3/2009 | Mizrah |
| 7,757,079 B2 | 7/2010 | Little et al. |
| 8,539,556 B1 * | 9/2013 | Brandwine ............. H04L 29/02 709/225 |

(Continued)

*Primary Examiner* — William Powers
(74) *Attorney, Agent, or Firm* — Miltons IP/p.i.

(57) ABSTRACT

A network includes encryption devices at customer sites and transport devices provide transport functionality for encrypted data for transmission across networks. A method of controlling access to a first plurality of functions of the encryption devices and access to a second plurality functions of the transport devices is disclosed. The method involves providing a customer with access to at least some of the first plurality of functions and providing a network service provider with access to at least some of the second plurality of functions. The method also involves providing the network service provider with restricted access to a first subset of the first plurality of functions and/or providing the network service provider with restricted access to a second subset of the second plurality of functions. This allows the customer and the service provider to share access to hardware resources such as the encryption devices and the transport devices.

26 Claims, 21 Drawing Sheets

(56) References Cited

U.S. PATENT DOCUMENTS

| | | | |
|---|---|---|---|
| 8,739,230 B2* | 5/2014 | McEnroe | H04N 7/17318 709/208 |
| 2002/0102999 A1* | 8/2002 | Maggenti | H04L 12/1822 455/518 |
| 2003/0046689 A1* | 3/2003 | Gaos | G06Q 30/02 725/34 |
| 2005/0008160 A1 | 1/2005 | Izawa et al. | |
| 2006/0031447 A1 | 2/2006 | Holt et al. | |
| 2007/0113089 A1* | 5/2007 | Yami | H04L 9/32 713/170 |
| 2007/0162748 A1 | 7/2007 | Okayama et al. | |
| 2009/0077371 A1 | 3/2009 | Powell et al. | |
| 2009/0077623 A1 | 3/2009 | Baum et al. | |
| 2010/0177901 A1 | 7/2010 | Bates et al. | |
| 2011/0110519 A1 | 5/2011 | Suzaki et al. | |

* cited by examiner

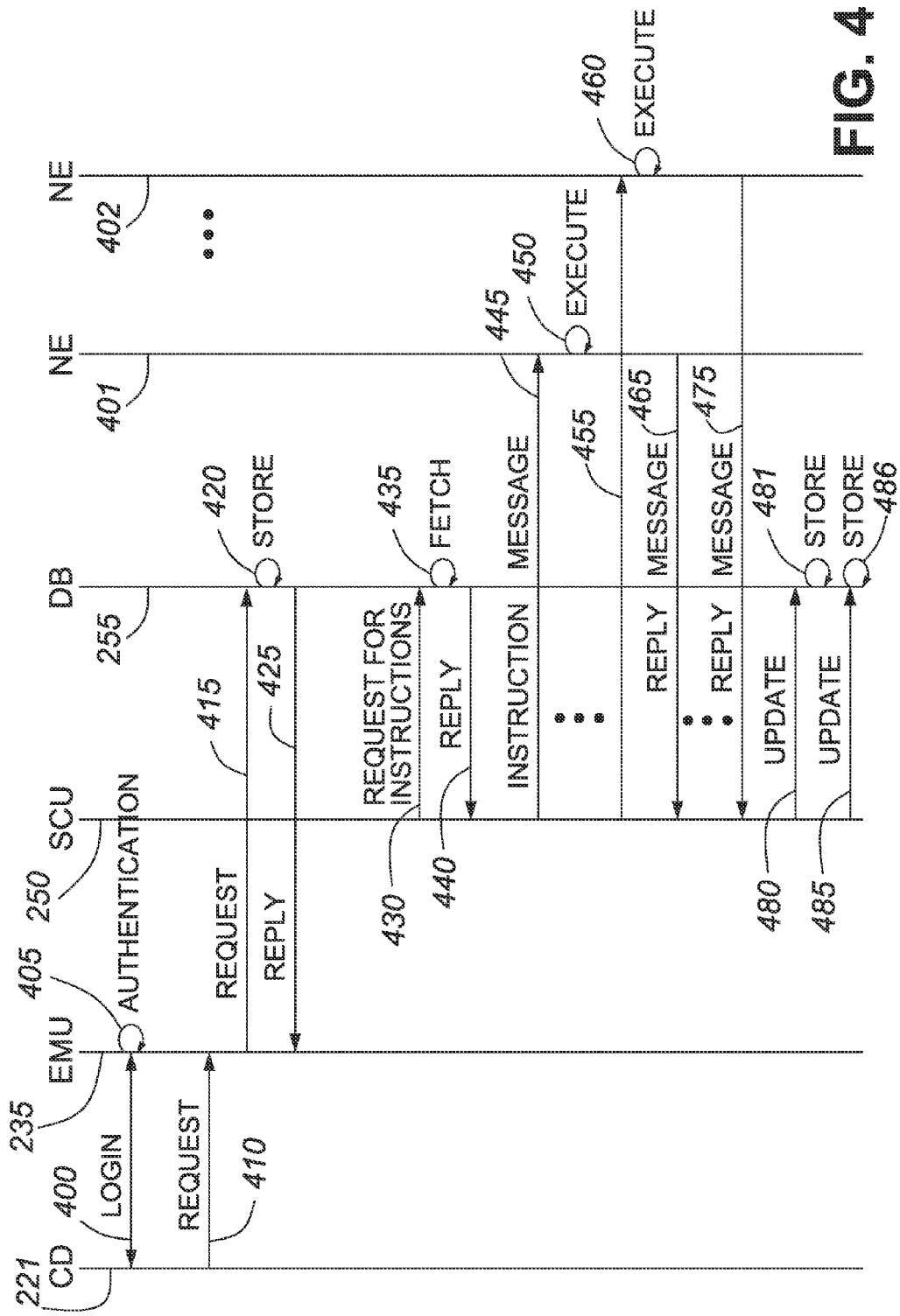

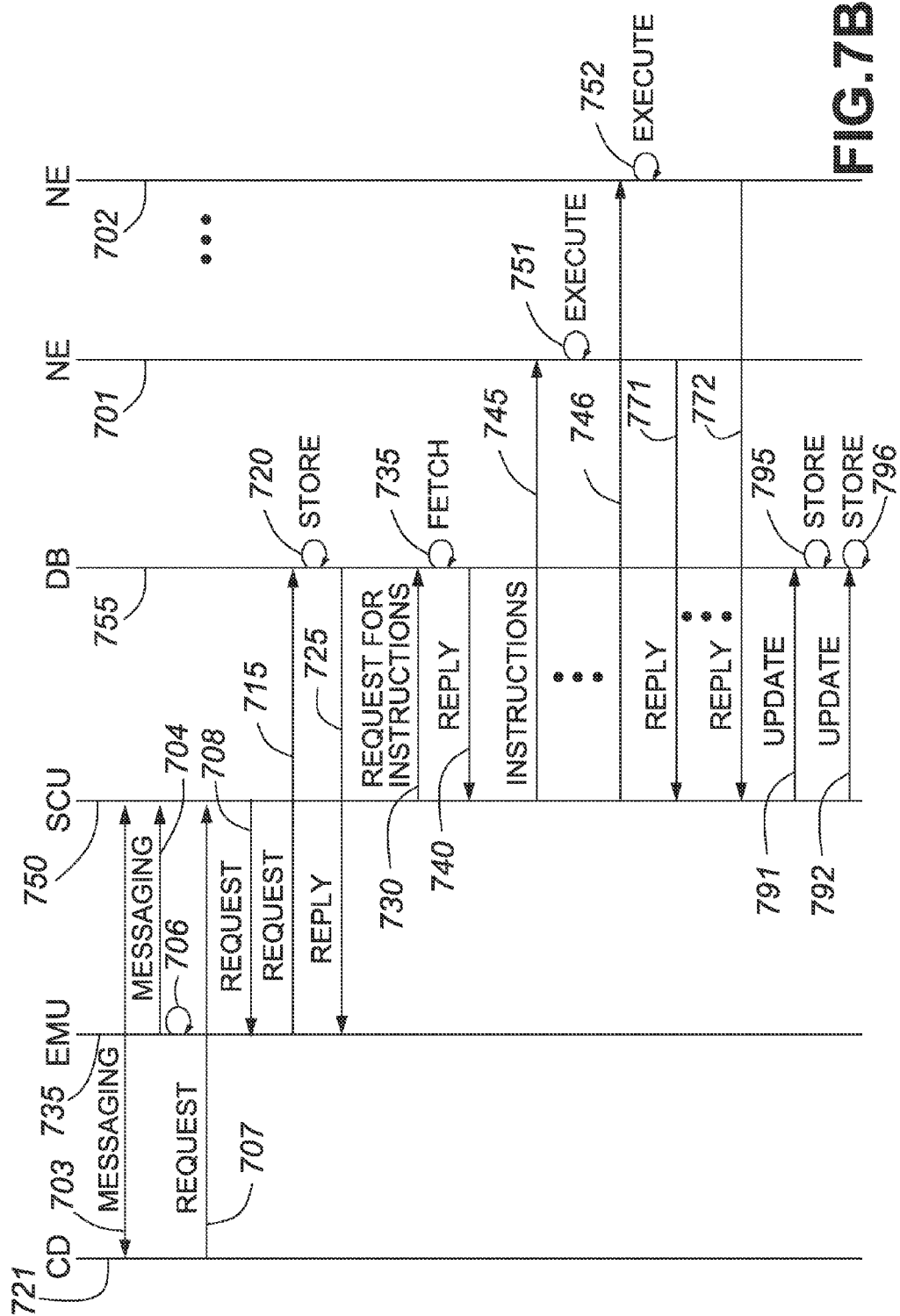

KEY ENCRYPTION SYSTEM, METHOD, AND NETWORK DEVICES

CROSS-REFERENCE TO RELATED APPLICATION

This application claims priority to provisional patent application No. 61/580,730 entitled "Key Encryption System, Method, and Network" and filed Dec. 28, 2011.

TECHNICAL FIELD

The present disclosure relates to encryption systems in networked environments.

BACKGROUND

There is an ever-expanding need to protect information transmitted across networks. At the same time it is important to provide cost-effective solutions for protecting the information that is transmitted. Transmitting data over networks involves the use of network devices that are owned by service providers and by customers of those service providers. Existing solutions rely on a customer providing encryption functionality at a customer premise and a network service provider supplying data transport functions. The separation of ownership of infrastructure based on this functionality requires that both the service provider and the customer acquire and maintain the necessary infrastructure to provide their respective functionalities. This can be a very expensive and can be a very in-efficient solution, which can especially affect the customers. Furthermore, in prior art systems access to devices owned by the customer has been restricted to the customers only, and the service provider is prevented from accessing functions or data that may not be too sensitive to keep secret from the service provider but could otherwise be useful to the service provider in providing its services. In addition, access to devices owned by the service provider has been restricted to the service providers only, and the customer is prevented from accessing functions or data that may not be too sensitive to keep secret from the customer but could otherwise be useful to the customer. This lack of inter-accessibility and flexibility results in limitations on how networks and network security with encryption can be managed.

SUMMARY

According to a first broad aspect, provided is a method of controlling access to a first plurality of functions of at least one encryption device and access to a second plurality functions of at least one transport device. The method involves providing a customer with access to at least some of the first plurality of functions and providing a network service provider with access to at least some of the second plurality of functions. The method also involves providing a network service provider with restricted access to a first subset of the first plurality of functions, the first subset of the first plurality of functions including at least one of the first plurality of functions.

In some embodiments, the customer is provided with restricted access to a second subset of the first plurality of functions, the second subset of the first plurality of functions including fewer than all of the first plurality of functions.

In some embodiments, the first and second subsets are different subsets.

In some embodiments, the method involves providing the customer with restricted access to a third subset of the second plurality of functions, the third subset including at least one of the second plurality of functions.

In some embodiments, the network service provider is provided with restricted access to a fourth subset of the second plurality of functions, the fourth subset of the second plurality of functions having fewer than all of the second plurality of functions.

In some embodiments, the third and fourth subsets are different subsets.

In some embodiments, the method involves maintaining a database of user credentials of users of the service provider; conducting user authentication by comparing received user credentials with the user credentials of the users of the service provider in the database; and, providing the users of the service provider with restricted access to the first subset of the first plurality of functions based on said authentication.

In some implementations, the customer and the service provider collectively own network elements with the network elements including the encryption device(s) and the transport device(s). In some embodiments, the method involves using a proxy to service user instructions from the customer and the service provider for accessing the first plurality of functions and the second plurality of functions, the proxy having limited access to the network elements.

In some embodiments, the method involves limiting available protocols for use in accessing the network elements by the service provider and the customer.

In some embodiments, each transport device includes a plurality of ports and the method involves limiting access by the customer to a restricted subset of the plurality of ports, the restricted subset of the plurality of ports including fewer than all of the plurality of ports.

In some embodiments, each encryption device includes a plurality of ports and the method involves limiting access by the service provider to a restricted subset of the plurality of ports, the restricted subset of the plurality of ports including fewer than all of the plurality of ports.

In some embodiments, the network elements collectively include a plurality of ports and the method involves storing the user instructions from the customer and the service provider in a database, each user instruction being intended for a respective one of the network elements. The method involves limiting access by the customer and the service provider to a respective subset of the plurality of ports, each respective subset comprising fewer than all of the plurality of ports. The method also involves accessing the user instructions from the database and servicing the user instructions by sending the instructions over encrypted communications paths to the respective network elements.

In some embodiments, the servicing of the user instructions involves converting the user instructions to a format for execution by the respective network elements.

In accordance with a second broad aspect, provided is a method of controlling access to a first plurality of functions of at least one encryption device and access to a second plurality functions of at least one transport device. The method involves providing a customer with access to at least some of the first plurality of functions and providing the customer with access to a subset of the second plurality of functions, the subset of the second plurality of functions including at least one of the second plurality of functions.

The method also involves providing a network service provider with access to at least some of the second plurality of functions.

In some embodiments, the method involves maintaining a database of user credentials of users of the customer; conducting user authentication by comparing received user credentials with the user credentials of the users of the customer in the database; and providing the users of the customer with restricted access to the subset of the second plurality of functions based on the user authentication.

In accordance with a third broad aspect, provided is a network device for controlling access to a first plurality of functions of at least one encryption device and access to a second plurality functions of at least one transport device. The network device includes an encryption management unit for, responsive to receiving first requests from the users of a customer, providing first instructions intended for the encryption device(s) for controlling access to at least some functions of the first plurality of functions and, responsive to receiving second requests from users of a network service provider, providing second instructions intended for the encryption device(s) for controlling access a subset of the first plurality of functions. The subset includes at least one of the first plurality of functions. The network device has a transport management unit for, responsive to receiving third requests from the users of the network service provider, providing third instructions intended for the transport device(s) for controlling access to at least some functions of the second plurality of functions. The network device also has a communications interface for receiving the first requests, the second requests, and the third requests and for transmitting the first instructions, the second instruction, and the third instructions.

In some embodiments, the network device includes a database for maintaining user credentials of the users of the service provider. The network device also includes an authentication unit for conducting a user authentication by comparing user credentials received through the communications interface with the user credentials of the users of the service provider in the database and for providing the users of the service provider with restricted access to the subset of the first plurality of functions based on the user authentication.

In some embodiments, the network device has a GUI (Graphical Interface) unit for providing a GUI to the network service provider. The GUI provides the users of the service provider with an interface for providing instructions for accessing the subset of the first plurality of functions.

In accordance with a fourth broad aspect, provided is a network device for controlling access to a first plurality of functions of at least one encryption device and access to a second plurality functions of at least one transport device. The network device has an encryption management unit for, responsive to receiving first requests from users of a customer, providing first instructions intended for the encryption device(s) for controlling access to at least some functions of the first plurality of functions. The network device has a transport management unit for, responsive to receiving second requests from users of a network service provider, providing second instructions intended for the transport device(s) for controlling access to at least some of the second plurality of functions. Responsive to receiving third requests from the users of the customer, the transport management unit also provides third instructions intended for the transport device(s) for controlling access a subset of the second plurality of functions. The subset includes at least one of the second plurality of functions. The network device also has a communications interface for receiving the first requests, the second requests, and the third requests and for transmitting the first instructions, the second instruction, and the third instructions.

In some embodiments, the network device has a database for maintaining user credentials of the users of the customer. The network device also has an authentication unit for conducting a user authentication by comparing user credentials received through the communications interface with the user credentials of the users of the customer in the database and for providing the users of the customer with restricted access to the subset of the second plurality of functions based on the user authentication.

In some embodiments, the network device has a GUI unit for providing a GUI to the customer. The GUI provides the users of the customer with an interface for providing instructions for accessing the subset of the second plurality of functions.

The above embodiments allow the customer and the service provider to share access to hardware resources such as the encryption devices and the transport devices. Furthermore, the above implementations provide some flexibility as to what entity, customer or service provider, can own a particular encryption device or transport device.

In accordance with a fifth broad aspect, provided is a method of providing fault detection. The method involves detecting faults and for each fault the method involves determining a port at which the fault occurred and identifying a connection associated with the port.

In some embodiments, the method involves performing a network device discovery process to identify network devices present on a network and modeling the network to establish a network topology of the network devices on the network, each network device having a respective plurality of ports. The method also involves, for at least one of the network devices, assigning the respective plurality of ports to at least two customers of a network service provider.

In some embodiments, the method involves assigning available communications circuits to the connections.

In some embodiments, the method involves performing a network device discovery process to identify a plurality of network devices present on a network, the plurality of network devices including a first subset of network devices owned by a service provider and a second subset of network devices owned by a customer of the service provider. The method also involves modeling the network to establish a network topology of the network devices on the network. Each network device has a respective plurality of ports and the network topology includes a plurality of connections, at least some of the connections including a connection between one network device of the first subset and one network device of the second subset.

In some embodiments, the method involves monitoring the performance of the plurality of connections.

In accordance with a sixth broad aspect, provided is a system. The system has a database having first instructions for controlling at least one encryption device, the encryption device(s) being managed by an EMU (Encryption Management Unit). The database also has second instructions for controlling at least one transport device, the transport device(s) being managed by a TMU (Transport Management Unit). The system also has an SCU (Security Core Unit) for servicing the first instructions and the second instructions by providing the EMU and TMU with the first instructions and the second instructions, respectively.

In accordance with a seventh broad aspect, provided is an article of manufacture having a computer usable medium having computer readable program code embodied therein for controlling access to a first plurality of functions of at least one encryption device and access to a second plurality functions of at least one transport device. The computer readable code in the article of manufacture includes computer readable code for providing a customer with access to at least some of the first plurality of functions. The computer readable code in the article of manufacture includes computer readable code for providing a network service provider with restricted access to a subset of the first plurality of functions, the subset of the first plurality of functions including at least one of the first plurality of functions. The computer readable code in the article of manufacture also includes computer readable code for providing the network service provider with access to at least some of the second plurality of functions.

BRIEF DESCRIPTION OF THE DRAWINGS

The features and advantages will become more apparent from the following detailed description of the preferred embodiments with reference to the attached figures, wherein:

FIG. 4 is a message flow diagram showing messaging involved between equipment in the system of FIG. 2A;

FIG. 7B is a message flow diagram showing messaging involved between equipment in the system of FIG. 7A;

DETAILED DESCRIPTION OF THE PREFERRED EMBODIMENTS

There is an ever-expanding need to protect information transmitted across networks. At the same time it is important to provide cost-effective solutions for protecting the information that is transmitted. However, existing solutions rely on a customer providing encryption functionality at a customer premise and a network service provider supplying data transport functions. There is no integration between these two functions resulting in a lack of cost-effective solutions for providing secure data transmission over networks. An exemplary prior art system will now be described with reference to FIG. 1.

Figure 1:
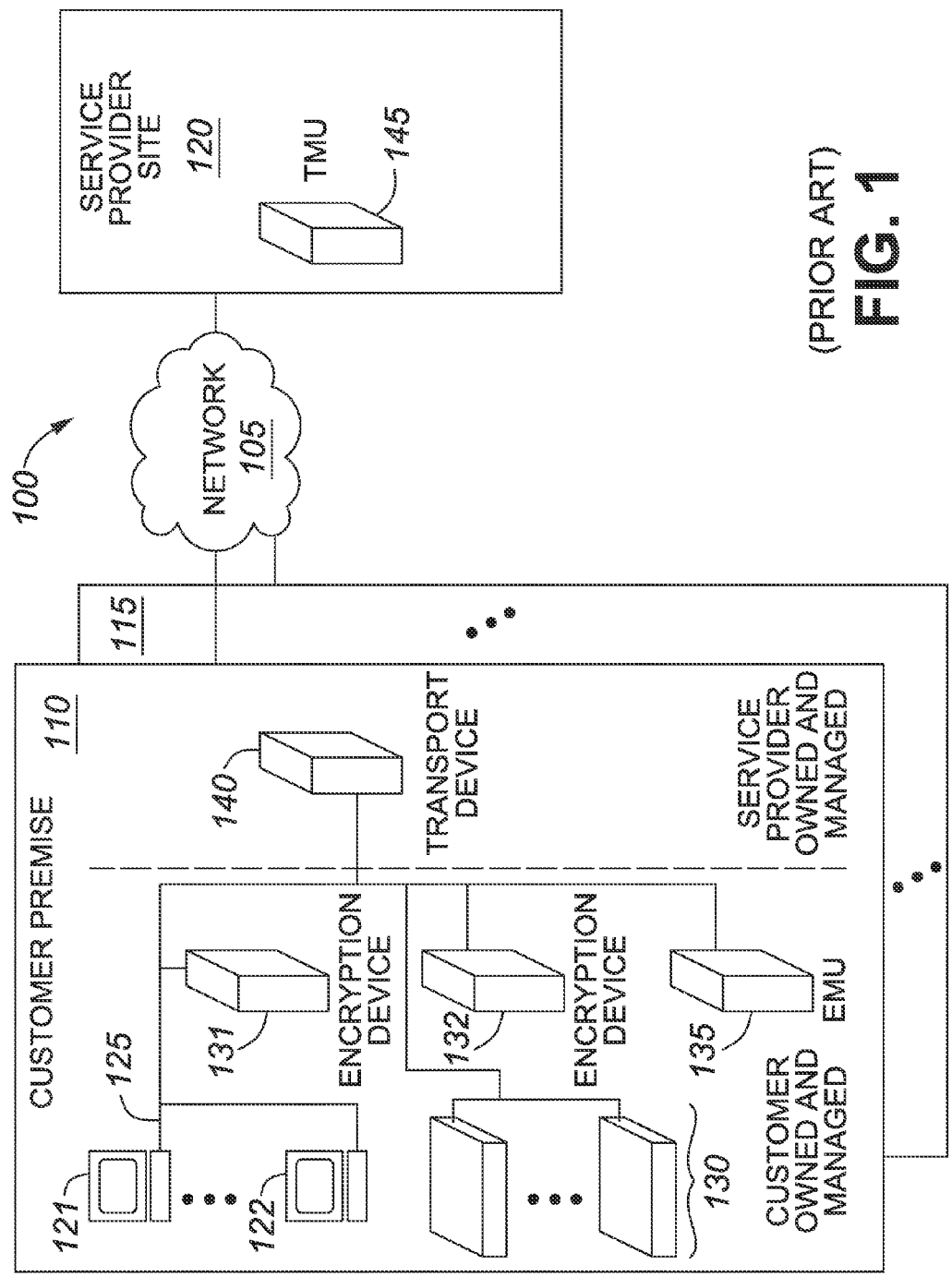
FIG. 1 is a diagram of a prior art system in a network for providing communications of encrypted data in the network.

In FIG. 1, shown is a diagram of a prior art system, generally indicated by 100, in a network for providing communications of encrypted data in the network. The system 100 includes equipment at customer premises 110, 115 (equipment is shown only for the customer premise 110) and a network service provider 120. Each customer premise 110, 110, 115 includes a plurality computing devices (CDs), such as PCs (Personal Computers) 121, 122 for example, interconnected on a LAN (Local Area Network) 125. A SAN (Storage Area Network) 130 is also present at the customer premises 110, 115. Also present at each customer premise 110, 115 are encryption devices 131, 132, an EMU (Encryption Management Unit) 135 and a transport device 140. Communications between equipment from one customer premise 110, 115 to another is made through a network 105 and provisioned by a network service provider through a TMU (Transport Management Unit) 145 at the network service provider site 120.

The encryption devices 131, 132 encrypt data originating from the computing devices 121, 122 and from the SAN 130 and destined for transmission across the network 105. The transport device performs well-known data transport functions for preparing data for transmission across the network 105. The EMU 135 provides management functions for managing the encryption devices 131, 132. The transport device 140 is controlled by the TMU 145 at the service provider site 120. In this prior art solution, whereas the encryption devices 131, 132 and the EMU 135 are owned and controlled by the client, the transport device 140 is owned by the network service provider and controlled by the network service provider using the TMU 145. In such an implementation there is no integration between the encryption functionality provided by the encryption devices 131, 132 and the EMU 135 and the transport functionality provided by the transport device 140. As a result the encryption and transport functionalities are implemented on separate devices thereby resulting in additional costs to the overall system. Furthermore, since management and maintenance of the encryption functionality and the encryption devices is the exclusive responsibility of the customer the network service provider is limited in its ability to control the reliability of the network.

Embodiments described below are used to illustrate how integration of encryption and transport functionalities can be achieved to provide cost-effective solutions and to provide a flexible and reliable network infrastructure.

Figure 2A:
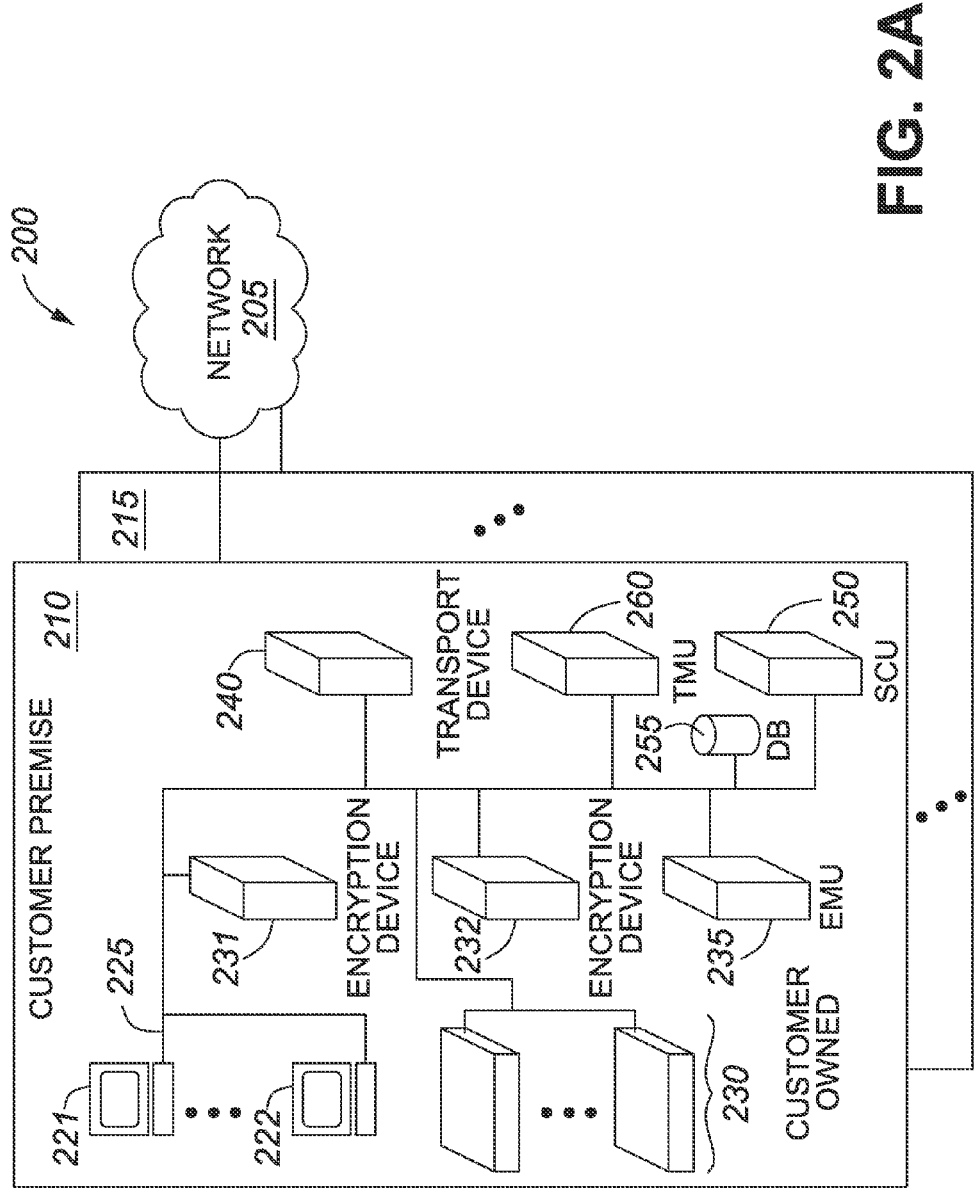
FIG. 2A is a diagram of a system in a network for providing communications of encrypted data in the network, according to an embodiment.

Referring to FIG. 2A, shown is a diagram of a system, generally indicated by 200, in a network for providing communications of encrypted data in the network, according to an embodiment. The system includes equipment at customer premises 210, 215. Each customer premise 210, 215 includes a plurality computing devices 221, 222 interconnected on a LAN 225. A SAN 230 is also present at the customer premise 210. Also present at each customer premise 210, 215 are encryption devices 231, 232, an EMU 235, a transport device 240, a SCU (Security Core Unit) 250, a DB (Database) 255, and a TMU 260. Communications between equipment from one customer premise 210, 215 to another is made through a network 205 and provisioned by the TMU 260, the SCU 250, and the database 255. In this deployment scenario the customer owns the encryption devices 231, 232, the transport device 240, the TMU 260, the EMU 235, the SCU 250, and the database 255. In FIG. 2A, the encryption devices 231, 232, the transport device 240, the TMU 260, the EMU 235, the SCU 250, and the database 255 are shown as separate physical devices. However, in other implementations the functionalities of two or more of the encryption devices 231, 232, the transport device 240, the TMU 260, the EMU 235, the SCU 250, and the database 255 are combined into a single device. For example, in some implementations the functionalities of the EMU 235, the SCU 250, and the database 255 are combined in a single device and the functionalities of the encryption devices 232, 231 and the transport device 240 are also combined in a single device. Advantageously, integrating different functions into a single device can provide lower costs of infrastructure.

The encryption devices 231, 232 encrypt data originating from the computing devices 221, 222 and the SAN 230 and destined for transmission across the network 205. The transport device 240 performs well-known data transport functions for preparing data for transmission across the network 205. The transport device 240 is controlled by the TMU 260 at the customer premises 210, 215.

Figure 3A:
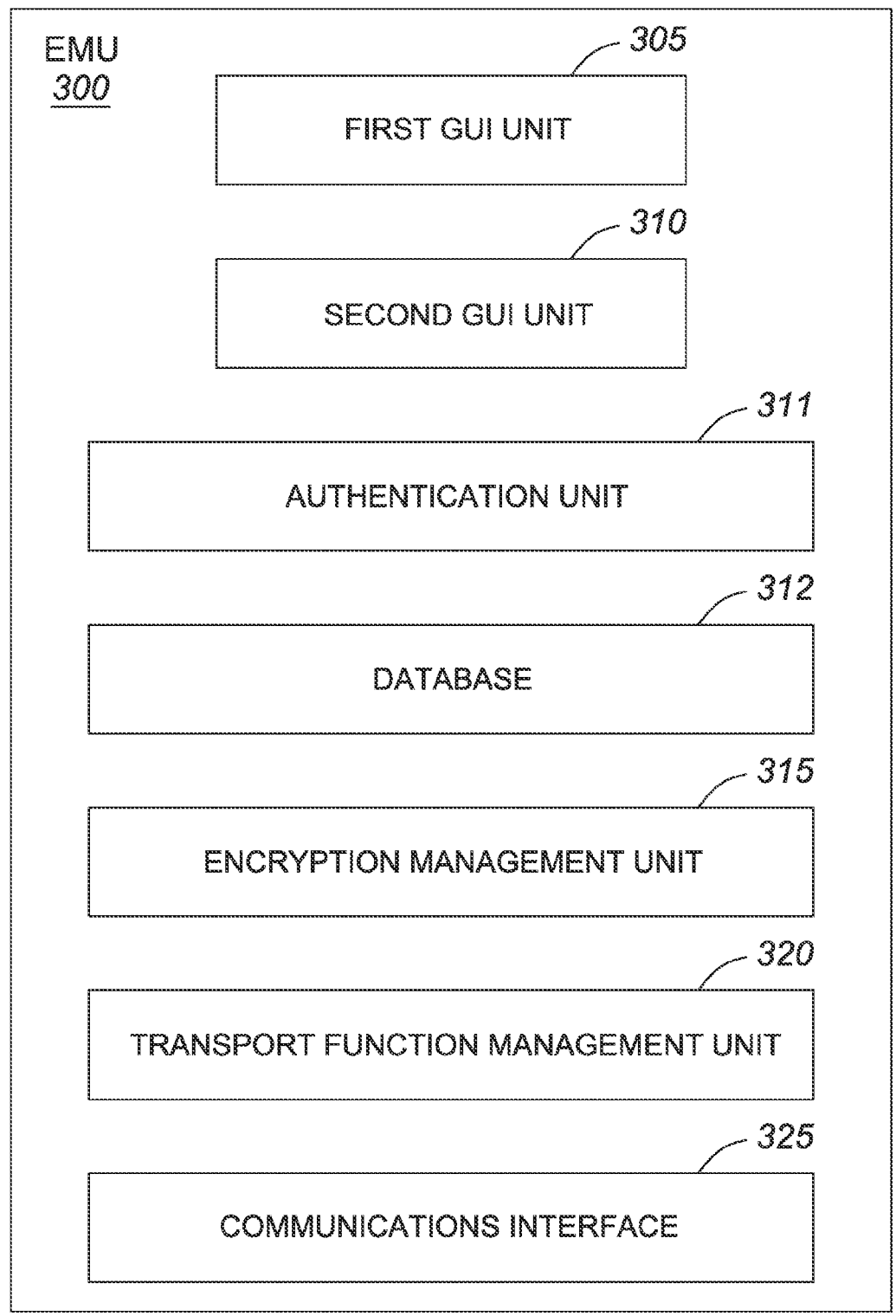
FIG. 3A is a block diagram of an exemplary EMU (Encryption Management Unit) for use in the system of FIG. 2A.

The EMU 235 provides management functions for managing the encryption devices 231, 232. More particularly, the EMU 235 provides a GUI (Graphical User Interface) that displays a personalized view to a user and allows the user to perform login operations, control security features provided by the EMU 235, and control transport functions provided by the transport device 240. The control security features include but are not limited to authentication and security key management. Security key management includes key data entry and on-demand and scheduled key rotations, for example. More particularly, the GUI allows the user to schedule key rotations. An exemplary EMU 300 is shown in FIG. 3A. The EMU 300 has first and second GUI units 305 and 310, respectively, an authentication unit 311, a database 312, an encryption management unit 315, a transport function management unit 320, and a communications interface 325. The communications interface 325 provides the EMU 300 with the capability of communicating with other network devices. The first GUI unit 305 provides a GUI to users of customers at remote devices. The first GUI unit 305 allows the users to provide instructions for controlling one or more encryption device and/or one or more transport device through a TMU. In response to receiving login requests and user credentials from both network service provider users and customer users the authentication unit 311 performs authentication of the users based on the user credentials. The database 312 stores the user credentials of both the network service provider users and the customer users, which are maintained by the network service provider and the customers, respectively. The authentication by the authentication unit 311 is done by comparing user credentials received through the communications interface 325 with the user credentials of the network service provider users and the customer users in the database 312.

In response to receiving instructions from users relating to an encryption function the encryption management unit 315 provides the received instructions to the encryption devices. In response to receiving instructions from users relating to a transport function the encryption management unit 315 provides the received instructions to a TMU responsible for controlling respective transport devices.

Figure 3B:
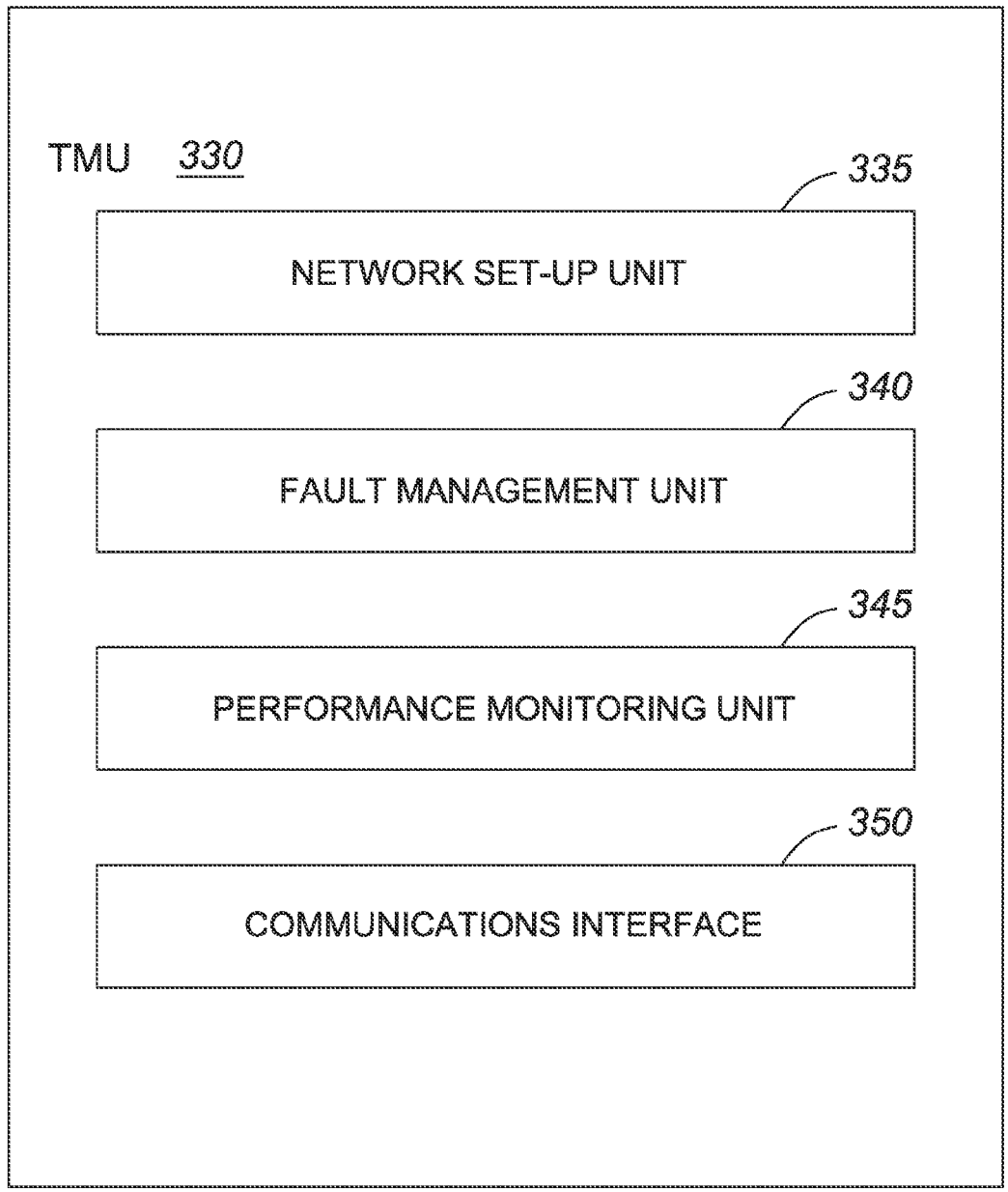
FIG. 3B is a block diagram of an exemplary TMU (Transport Management Unit) for use in the system of FIG. 2A.

As discussed above, with reference back to FIG. 2A the TMU 260 controls the transport device 240 at the customer premises 210, 215. More particularly, the TMU 240 sets up traffic paths between transport devices 240 at different customer premises 210, 215, provides fault management functions, and provides performance monitoring functionality. An exemplary TMU 330 is shown in FIG. 3B. The TMU 330 has a network set-up unit 335, a fault management unit 340, a performance monitoring unit 345, and a communications interface 350. The communications interface 350 provides the TMU 330 with the capability of communicating with other network devices. The network set-up unit 335 sets up traffic paths between transport devices. The fault management unit 340 provides fault management functions, and the performance monitoring unit provides performance monitoring functionality.

Example transports functions include security management functions, fault management functions, and performance monitoring functionality under the FCAPS (Fault, Configuration, Accounting, Performance, Security) ISO Telecommunications Management Network model and framework for network management, for example. In the embodiment of FIG. 2A, communications between equipment at different customer premises 210, 215 need not be between sites that belong to the same customer but can be remote sites from different entities. For example, in some implementations while one customer premise 210, 215 is associated with one customer another customer premise site 210, 215 may be associated with a remote site associated with a cloud computing services provider.

Referring back to FIG. 2A, the database 255 stores instructions for the TMU 260 and the EMU 235 to perform their respective tasks. More particularly, the database stores information for allowing the EMU 235 and the TMU 260 to control the encryption devices 231, 232 and the transport device 240, respectively. The database 255 also provides updates on the status of network elements such as the transport device 240, the encryption devices 231, 232, and any other suitable network devices. The database 255 is accessible through the SCU 250.

Figure 3C:
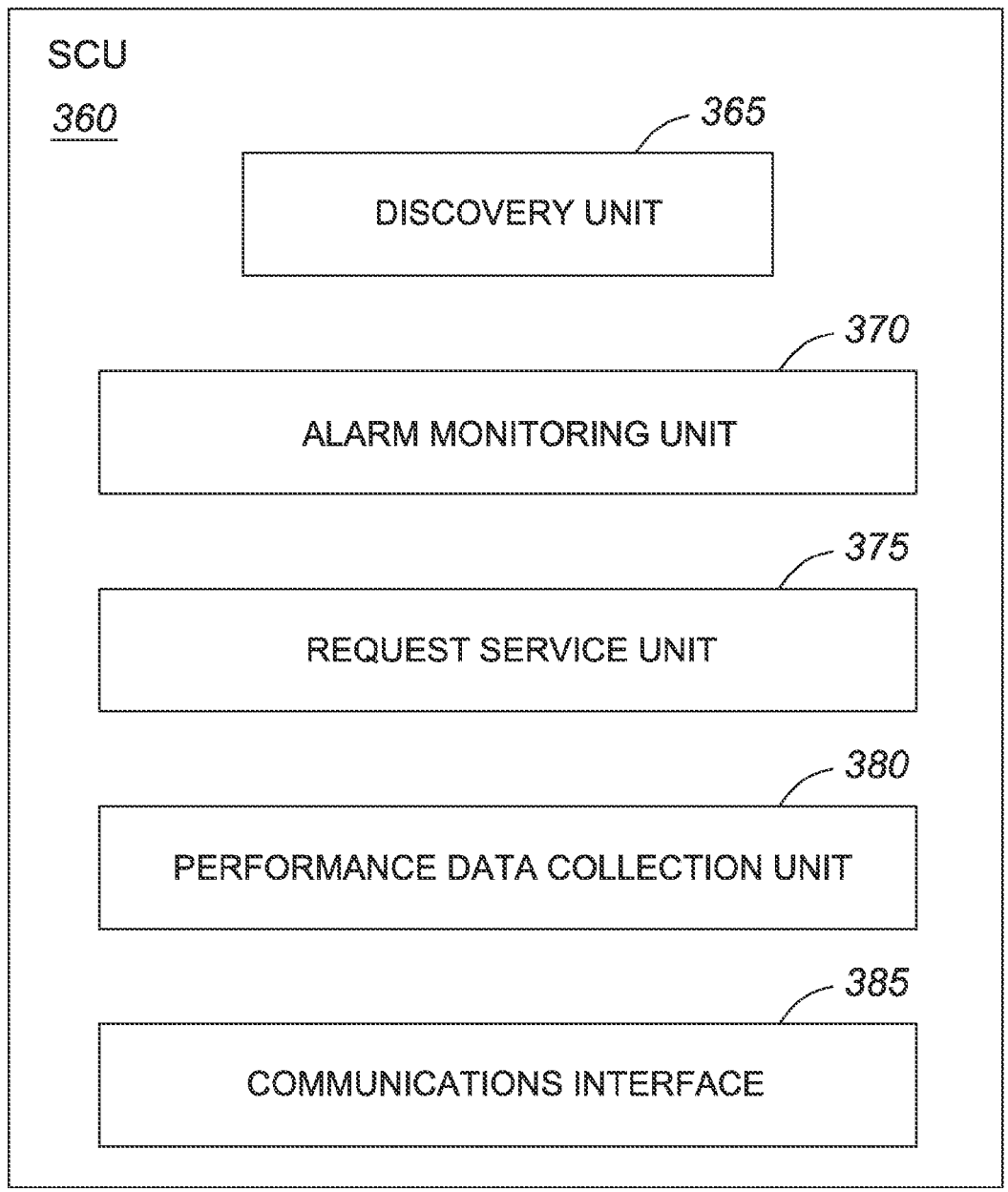
FIG. 3C is a block diagram of an exemplary SCU (Security Core Unit) for use in the system of FIG. 2A.

The SCU 250 performs discovery of network elements such as the transport device 240, the encryption devices 231, 232, and any other suitable network devices. The SCU 250 also performs alarm monitoring and performance data collection, and interfaces with the encryption devices 231, 232 and the transport device 240 to provide them with instructions. An exemplary SCU 360 is shown in FIG. 3C. The SCU 360 has a discovery unit 365, an alarm monitoring unit 370, request service unit 375, a performance data collection unit 380, and a communications interface 385. The communications interface 385 provides the SCU 360 with the capability of communicating with other network devices.

The discovery unit 365 performs a discovery process wherein network devices are identified. The alarm monitoring unit 370 performs alarm monitoring and the performance data collection unit 380 collects performance data. The request service unit 375 interfaces with encryption devices and transport devices via the communications interface 385 to provide them with instructions through service requests.

Example alarm monitoring functions include but are not limited to key expiration, key mismatch, and authentication mismatch. Examples of data being collected include but are not limited to the number of key rotations, the number of successful key rotations, the number of authentications, the number of successful authentications, and the number of times a particular link was broken and recovered. The SCU 360 also acts on behalf of a user or subscriber by servicing requests. More particularly, the SCU 360 services request by connecting to network elements such as transport devices, encryption devices, and any other suitable network devices. The SCU 360 also reports any updates on network elements to a database such as the database 255 of FIG. 2A.

In some implementations the first GUI unit 305, the second GUI unit 310, the encryption management unit 315, and the transport function management unit 320 of the EMU 300 of FIG. 3A, the network set-up unit 335, the fault management unit 340, and the performance monitoring unit 345 of the TMU 330 of FIG. 3B, and the discovery unit 365, the alarm monitoring unit 370, the request service unit 375, and the performance data collection unit 380 of the SCU 360 of FIG. 3C are implemented using a combination of hardware including a processor and memory, and software in the form of computer readable code readable instructions executable by the processor. However, it is to be clearly understood that the functionality of any of the EMU 300, the TMU 330, and the SCU 360 can be implemented using any one of hardware, software and firmware, or any suitable combination thereof. The software and the firmware can be implemented any suitable article of manufacture having a computer usable medium having computer readable program code embodied therein for providing the functionality of a respective one of the EMU 300, the TMU 330, and the SCU 360. More specifically, the computer readable code includes code for providing instructions required to provide the functionality. Furthermore, the EMU 300, the TMU 330, and the SCU 360 of FIGS. 3A, 3B, and 3C, respectively, are described as separate devices. However, it is to be clearly understood that in some implementations, the functionalities of any two or more of the EMU 300, the TMU 330, and the SCU 360 of FIGS. 3A, 3B, and 3C, respectively, are combined into a single device.

Further details of the operation of the EMU 235, the SCU 250, the database 255, and network elements such as the encryption devices 231, 232 and the transport device 240 of FIG. 2A will now be described with reference to FIG. 4.

In FIG. 4, shown is a message flow diagram showing messaging involved between equipment in the system of FIG. 2A. A user at a computing device undergoes a login process 400 which involves messaging between the computing device 221 and the EMU 235, together with authentication 405. The authentication makes use of exchange of a username and password between the computing device 221 and the EMU 235, for example. The login process 400 includes the EMU providing instructions (not shown) for displaying a GUI at the computing device 221 for the user to input a username and password. With reference to FIG. 3A, the first or second GUI units 305, 310 will provide a GUI depending on user credentials. Once logged in 400 the user can input instructions and the instructions are sent as a request 410 from the computing device 221 to the EMU 235. The EMU 235 communicates with the database 255 to relay the request 410 in the form of a request 415 to the database 255 where it is stored 420. The database 255 then responds with a reply 425 indicating that the request 415 has been stored. The SCU 250 periodically sends requests 430 for instructions (only one request shown in FIG. 4) to the database 255. Responsive to receiving the request 430, the database 255 fetches 435 instructions that may be present in the database 255 and sends a reply 440 containing the instructions to the SCU 250. In some instances the instructions are intended for a particular one of the network elements 401, 402, which, as discussed above, could be an encryption device, a transport device, or other suitable networking device for example, and the instructions have associated with them an identifier of the particular network element 401, 402. The instructions are then sent in respective instruction messages 445, 455 to the network element or network elements 401, 402 using the identifier for execution 450, 460 of the instructions by the network element or elements 401, 402. The network elements 401, 402 reply to the SCU with reply messages 465, 475, respectively, containing information relating to the instructions sent by the SCU 250. The SCU 250 responds by sending update messages 480, 486 containing the received information to the database 255 for storage 490, 495, respectively, by the database 255.

Communications between the EMU 235, the SCU 250, and the database 255 is made using the SOAP (Simple Object Access Protocol) Protocol for example. Furthermore, communication between the SCU 250 and the network elements 401, 402 is made using any one or more of the CLI (Common Language Interface), SNMP (Simple Network Management Protocol), and TL1 (Transaction Language 1) protocols. However, it is to be clearly understood that embodiments are not limited to any particular protocol or protocols and that any suitable protocol can be used. The messaging flow of FIG. 4 is such that the SCU 250 serves as a proxy for communications between the EMU 235 which is accessed by users and the network devices 401, 402. In this way the EMU 235 has not direct access and no direct path to the network devices 401, 402.

There are several types of instructions that can be provided by the SCU 250 to the network elements. Some of these instructions are intended for network elements, such as encryption devices for example, and include but are not limited to requests for storing security keys, requests for scheduling of security key rotations, setting keys, check status of encryption. Some instructions are intended for network elements, such as transport devices for example, and include but are not limited to requests for discovery of network elements, requests for setting up traffic paths, requests for performing fault management functions, and requests for conducting performance monitoring, requests for alarms, requests for information on transport states, and request for information pertaining to ports such as protocols used and bit rates, for example.

Referring back to FIG. 2A, the encryption devices 231, 232 each have a number of functions. With reference to FIG. 3A, in some implementations the first GUI unit 305 restricts access by the customers to certain functions of the encryption devices 231, 232 and/or the transport device 140 by limiting the instructions that the customer can provide for controlling the encryption devices 231, 232 and the transport device 140. For example, a customer may be provided with access to certain alarm data, performance data pertaining to transport circuits, and information on errors on data circuits for transport signals. In addition, in some implementations the second GUI unit 310 restricts access by network service providers to certain functions of the encryption devices 231, 232 and/or the transport device 140 by limiting the instructions that the network service providers can provide for controlling the encryption devices 231, 232 and the transport device 140. For example, a service provider may be provided with information and functions pertaining to success/failure of rotations, state of encryption, pass/failure of key rotations, WKAT tests, PSK tests, and other errors.

The conventional prior art system of FIG. 1 requires that the customers retain ownership of the EMU 135 and the encryption devices 131, 132 in order to retain control over security of data being transmitted. Furthermore, in FIG. 1 the transport device 140 is owned by the network service provider so that the service provider can retain control over certain transport functions provided by the transport device. In the embodiment of FIGS. 2A and 3A, restricting access by the customer and network service provider to control functions provided by encryption devices 231, 232 and transport devices allows for different deployment scenarios to be feasible while maintaining customer requirements for security intact. For example, with reference to FIGS. 2A and 3A, in this embodiment an administrator working for the network service provider can have limited access to the encryption devices 231, 232 and the transport device 140 by providing instructions accessed via the second GUI unit 310 at the EMU 300. More specifically, in some implementations the instructions that the administrator can provide via the second GUI unit 310 are restricted and exclude instructions for accessing and controlling encryption keys, for example. In this way, the customer can allow the network service provider to access restricted functions of the encryption devices 231, 232 while maintaining control over encryption keys and overall security of communications. For example, in some implementations the network service provider is given access to monitor errors associated with the encryption devices 231, 232 in connection with key rotations, authentication failures, discovery issues, and system software status for example to ensure that programmed tasks are operating correctly. This allows the network service provider to ensure that users can login and manage circuits they own and also allows the network service provider to inform customers of any function that the customer needs to carry out. Such functions include functions for which only the customer can execute, for example. Restricted functions given to the network service provider also include functions for accessing a control setup to create user accounts for customers to gain access to their respective functions within the EMU 300.

The second GUI unit 310 allows the administrator of the network service provider to control functions for the transport device 140, which are necessary for providing the network service offered by the network service provider. Examples of such functions include, but are not limited to, the ability to turn on and off ports within a device, view an inventory of the encryption devices 231, 232 and the transport device 140, view alarms in the system 200 that prevent the system 200 from performing programmed tasks, view network device availability data, and force an inventory command to ensure that data in the database 255 is synchronized. In some implementations, access to EMU functions by the network service provider is restricted and does not allow the network service provider to disable ports or enable and disable services. Instead, the network service provider is provided with only a read-only view of the status of the ports and the services. In addition, in some implementations the instructions that a customer's user can provide via the first GUI unit 305 are restricted. For example, the network service provider may wish to retain control of certain functions of the encryption devices 231, 232 and the customer is prevented from accessing those functions through the GUI. For example, in some implementations the network service provider can setup a method in which keys or WKAT material are created for the customer. Examples include but are not limited to random strings, manual creation via the EMU GUI, connection to an external server that can create keys such as a key repository for example. The network service provider may also want to allow the customer to have restricted access to certain transport functions. In such cases the first GUI unit 305 would allow the customer to provide instructions for controlling restricted transport functions. An example of such a transport function is the ability for the client to authenticate circuits or network connections. The network service provider can also allow the customer test the authentication of a circuit to ensure that end points of the circuit are correctly setup and use a customer entered string to validate encryption keys at both ends of the circuit. This is referred to a PSK (Pre-Shared Key), which is used for authentication of two end-points of a circuit.

In this way, the network service provider can allow the customer to access restricted functions of the transport device 140 while maintaining control over the transport device 140.

The deployment scenario of FIG. 2A is only one of many possible deployment scenarios that are possible by limiting access by users and administrators to functions provided by the encryption devices 231, 232 and transport device 140. Additional exemplary deployment scenarios will now be discussed in further detail.

Figure 2B:
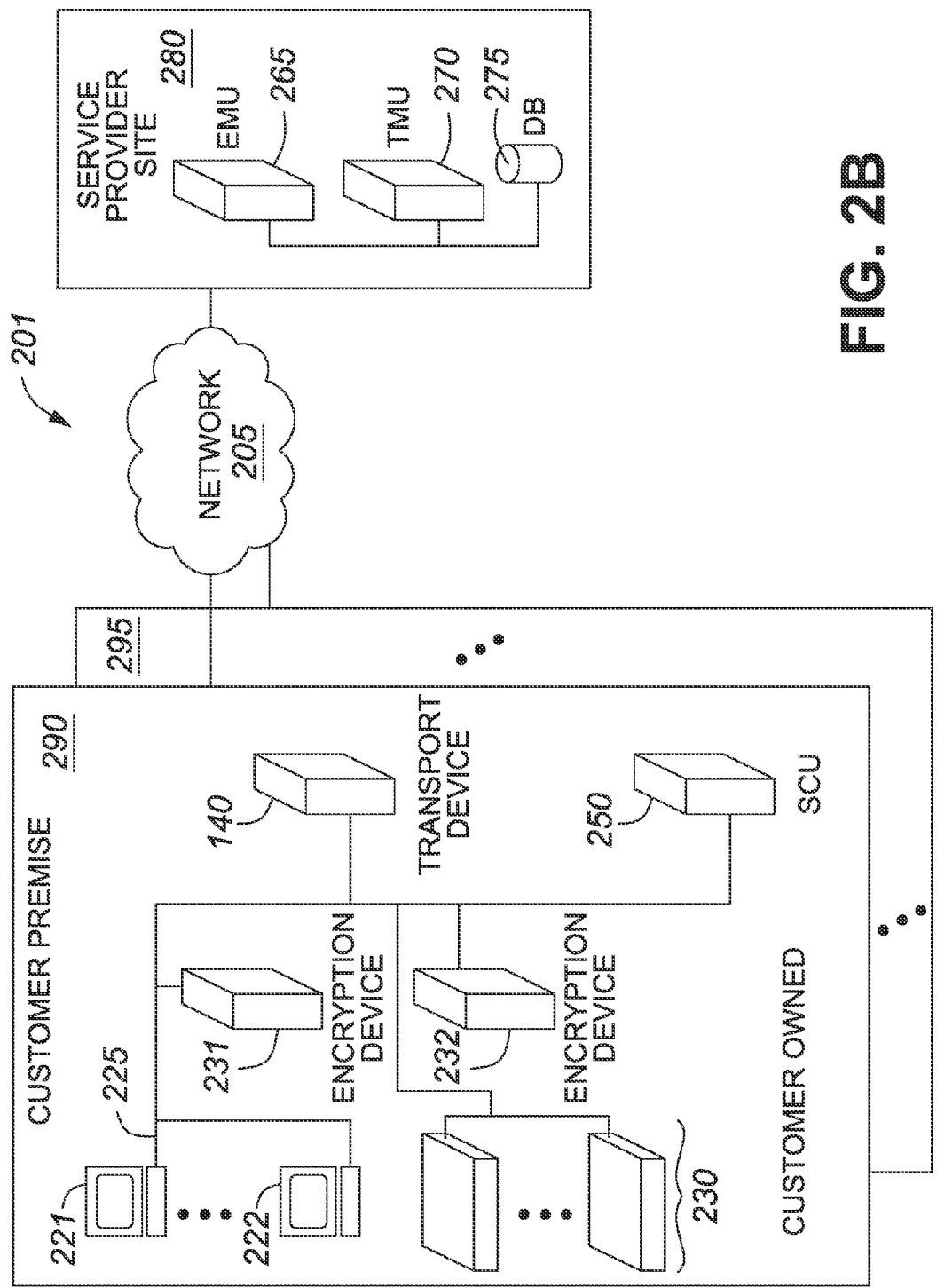
FIG. 2B is a diagram of a system in a network for providing communications of encrypted data in the network, according to another embodiment.

Referring to FIG. 2B, shown is a diagram of a system, generally indicated by 201, in a network for providing communications of encrypted data in the network, according to another embodiment. FIG. 2B is similar to FIG. 2A except that the EMU 235, the TMU 260 and the database 255 at the customer premises 210, 215 of FIG. 2A are replaced with an EMU 265, a TMU 270, and a database 275 at a service provider site 280. In this deployment scenario whereas the customer owns the encryption devices 231, 232, the transport device 240 and the SCU 250 at customer premises 290, 295, the network service provider owns the EMU 265, the TMU 270, and the database 275. Advantageously, when compared to FIG. 2A in the embodiment of FIG. 2B the functionality of a number of EMUs at the customer premise sites have been replaced with a single EMU 265 at the service provider site 280. More generally, the service provider site can have N EMUs where N is an integer with N≥1, each capable of managing one or more encryption device at one or more customer premise or remote site. In addition, as will be discussed in further detail below in some implementations a particular EMU is also capable of managing encryptions devices for a plurality of customers. In the exemplary deployment scenario of FIG. 2B both the encryption devices 231, 232 and the transport device 140 are owned by the customer and advantageously the functionalities of the encryption devices 231, 232 and the transport device 140 can be integrated into the same physical device. This flexibility provides a cost effective way to implement encryption and transport device functionality.

Figure 5:
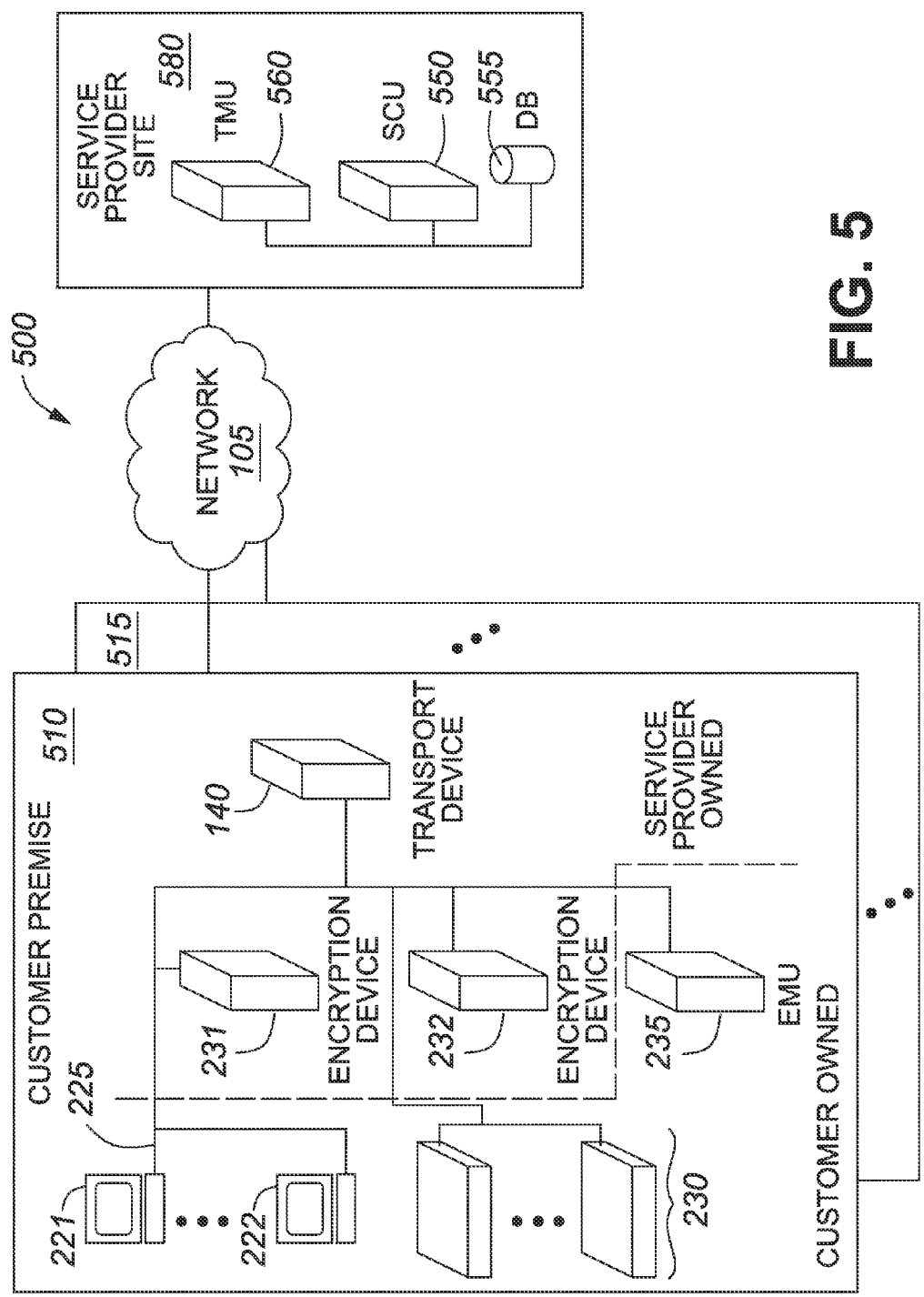
FIG. 5 is a diagram of a system in a network for providing communications of encrypted data in the network, according to another embodiment.

Referring to FIG. 5, shown is a diagram of a system, generally indicated by 500, in a network for providing communications of encrypted data in the network, according to another embodiment. FIG. 5 is similar to FIG. 2A except that in this deployment scenario it is the network service provider instead of the customer that owns the encryption devices 231, 232 and the transport device 140. Furthermore, the TMU 260, the SCU 250, and the database 255 at the customer premises 210, 215 of FIG. 2A have been replaced with a TMU 560, an SCU 550, and a database 555 located at a service provider site 580. In this deployment scenario the TMU 560, the SCU 550, and the database 555 are owned by the service provider. As will be described in detail below a particular encryption device or transport device can be configured to service more than one customer. Advantageously, shifting ownership of the encryption devices and the transport devices from the customer to the network service provider provides the network service provider with the capability of not only incorporating encryption and transport functionalities together in the same physical device but also use the same physical device for servicing a plurality of customers.

Figure 6A:
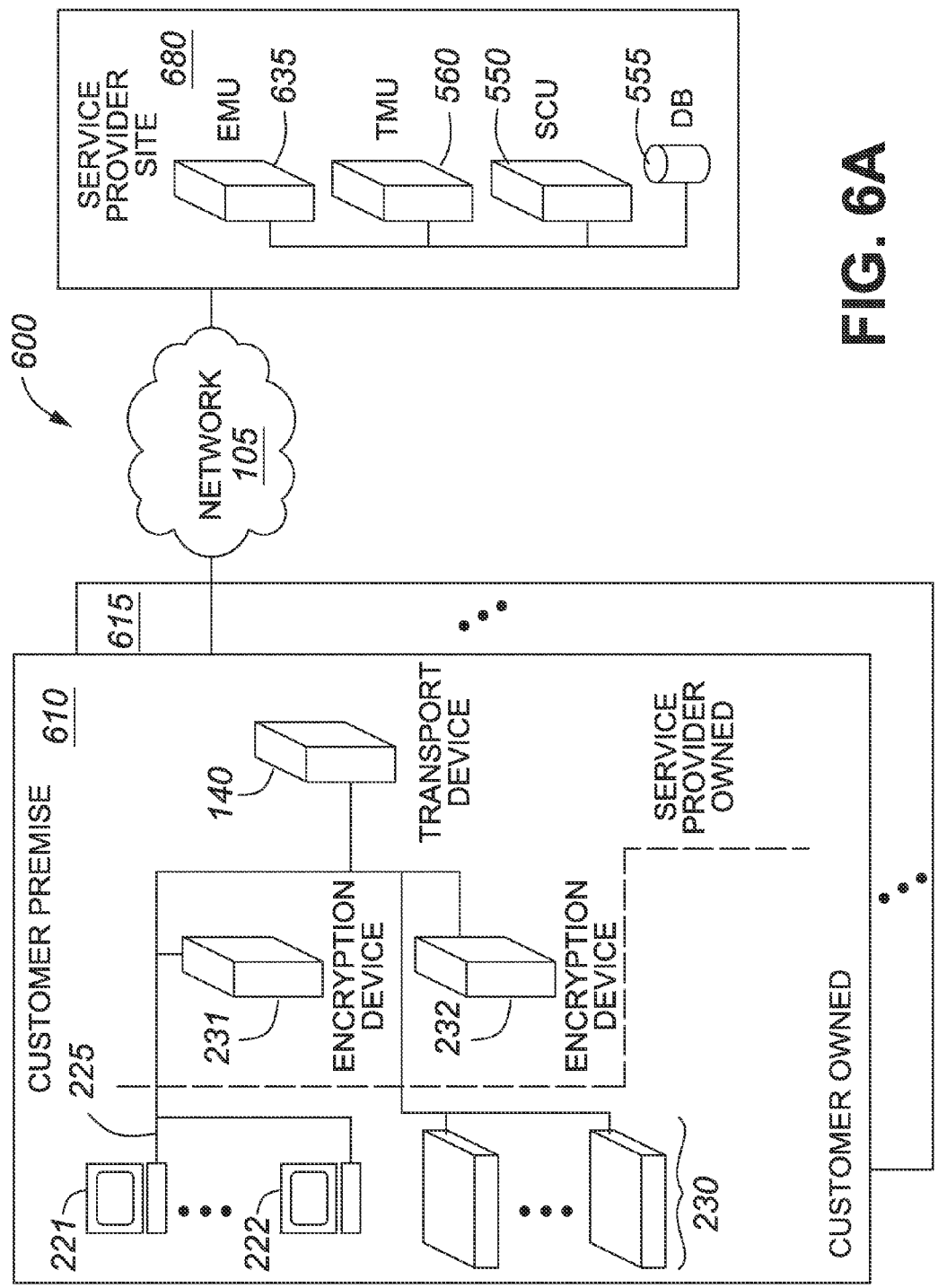
FIG. 6A is a diagram of a system in a network for providing communications of encrypted data in the network, according to another embodiment.

Referring to FIG. 6A, shown is a diagram of a system, generally indicated by 600, in a network for providing communications of encrypted data in the network, according to another embodiment. FIG. 6A is similar to FIG. 5 except that in this deployment scenario the EMU 235 at the customer premises 510, 515 of FIG. 5 are replaced with an EMU 635 located at a service provider site 680, and customer premises 610, 615 need not have EMUs. In this deployment scenario the EMU 635 is owned by the network service provider. Advantageously, the EMU 635 in this scenario can service more than one customer. More generally, in some implementations the network service provider will have one or more EMUs for managing a plurality of encryption devices for one or more customers.

Figure 6B:
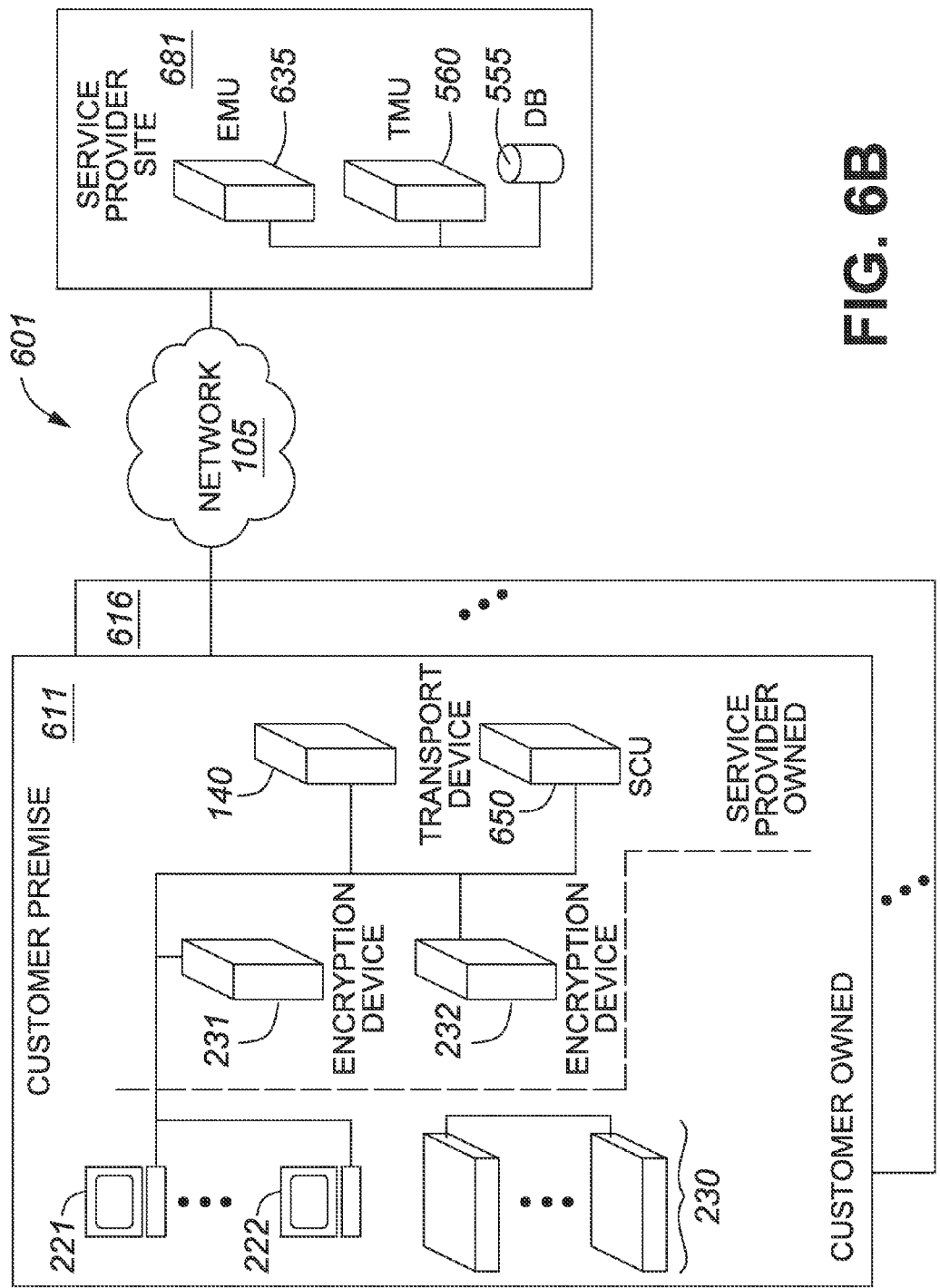
FIG. 6B is a diagram of a system in a network for providing communications of encrypted data in the network, according to another embodiment.

Referring to FIG. 6B, shown is a diagram of a system, generally indicated by 601, in a network for providing communications of encrypted data in the network, according to another embodiment. FIG. 6B is similar to FIG. 6A except that in this deployment scenario the SCU 550 at the service provider site 680 of FIG. 6A is replaced with SCU 650 located at the customer premise sites 611, 616 (only one SCU 560 shown), and the service provider site 681 need not have an SCU. In this deployment scenario the SCU 650 is owned by the network service provider.

With reference back to FIG. 4, the message flow was described with reference to the embodiment of Figure described above with reference to FIG. 4 applies to each embodiment of FIGS. 2A, 2B, 5, 6A, and 6B.

Figure 7A:
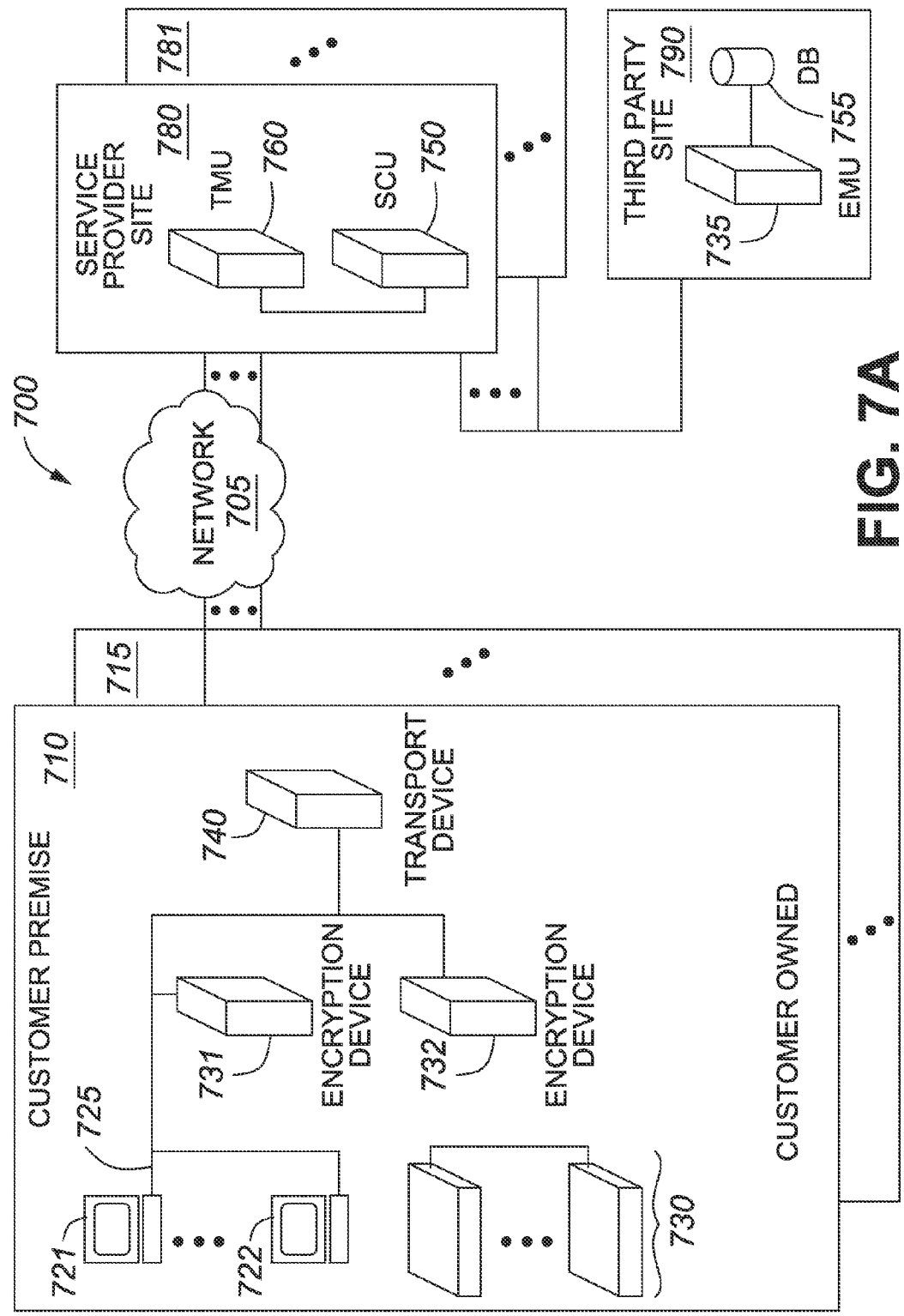
FIG. 7A is a diagram of a system in a network for providing communications of encrypted data in the network, according to another embodiment.

Referring to FIG. 7A, shown is a diagram of a system, generally indicated by 700, in a network for providing communications of encrypted data in the network, according to another embodiment. The system includes equipment at customer premises 710, 715 (equipment shown only for the customer premise 710), at service provider sites 780, 781 (equipment shown only for the service provider site 780), and at a third party site 790. Each customer premise 710, 715 includes computing devices 721, 722 interconnected on LAN 725. A SAN 730 is also present at the customer premises 710, 715. Also present at each customer premise 710, 715 are encryption devices 731, 732 and a transport device 740. Each service provider site 780, 781 has an SCU 750 and a TMU 760. The third party site 790 had an EMU 735 and a database 755.

Communications between equipment from one customer premise 710, 715 to another is made through a network 705 and provisioned by a network service provider through the TMU 760 and the SCU 750 located at the service provider sites 780, 781. In other deployment scenarios the SCU 750 at the service provider site 780 is replaced with SCUs at the customer premises. The message flow described above with reference to FIG. 4 applies to the embodiment of FIG. 7A, except that the SCU 750 serves as a proxy for the EMU 735 for login procedures initiated by users at the computing devices 721, 722. The SCU 750 also serves as a proxy for the EMU 735 for requests from the computing devices 721, 722, which are destined for the EMU 735. In the embodiment of FIG. 7A, the EMU 735 at the third party site 790 serves as a web portal for access by the users through the SCU 750.

Figure 8A:
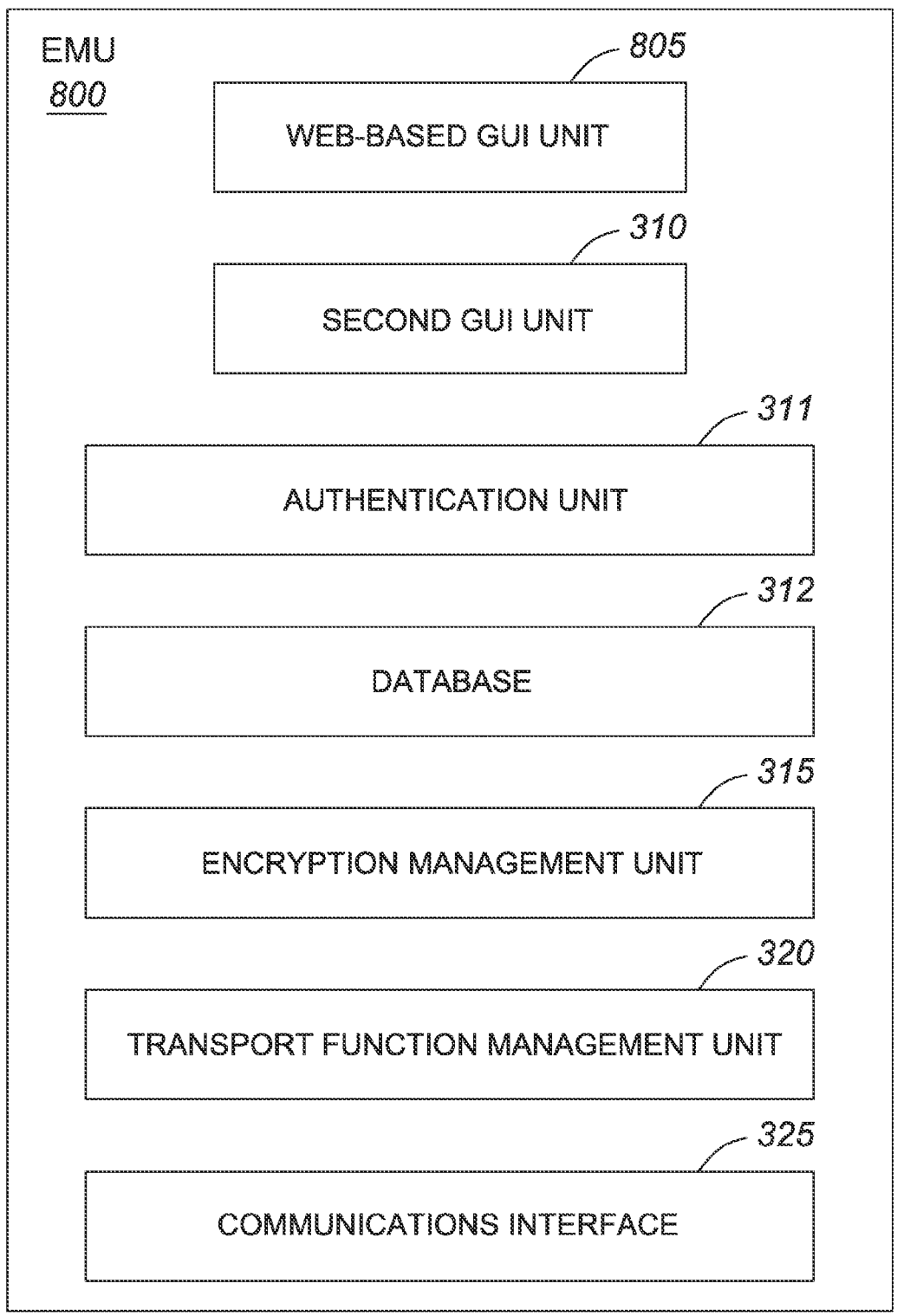
FIG. 8A is block diagram of an exemplary EMU used in the system of FIG. 7A.
Figure 8B:
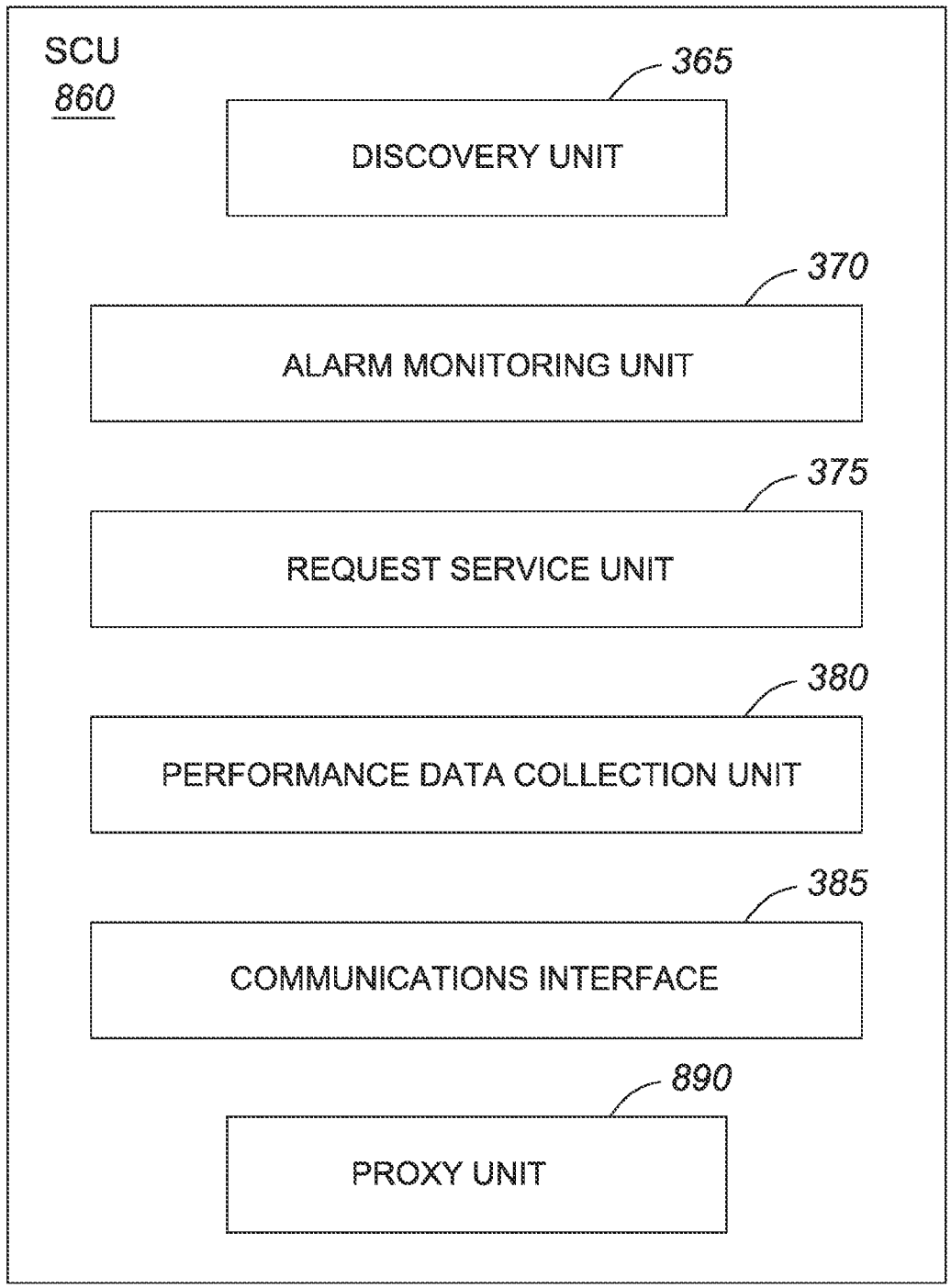
FIG. 8B is a block diagram of an exemplary SCU for use in the system of FIG. 7A.

Referring to FIG. 8A, shown is block diagram of an exemplary EMU 800 used in the system 700 of FIG. 7A. The EMU 800 of FIG. 8A is similar the EMU 300 of FIG. 3A, except that the first GUI unit 305 of the EMU 300 of FIG. 3A is replaced with a web-based GUI unit 805 in the EMU 800 of FIG. 8A. The web-based GUI unit 805 provides the EMU 800 of FIG. 8A with web portal functionality that allows users at the customer premises to access the EMU 800 through a web-based GUI for servicing requests. A block diagram of an exemplary SCU 860 for use in the system 700 of FIG. 7A is shown in FIG. 8B. The SCU 860 of FIG. 8B is similar to the SCU 360 of FIG. 3C except that the SCU 860 of FIG. 8B also includes a proxy unit 890 for providing proxy functionality for the EMU 735 of FIG. 7A.

The messaging flow for communications between equipment in the system 700 of FIG. 7A will now be described in more detail with reference to FIG. 7B. A user at computing device 721 undergoes a login process. In this exemplary deployment scenario the EMU 735 serves as a proxy for the SCU 750 and the login process between the computing device 721 and the EMU 735 involves messaging through the SCU 750. More specifically, the login procedure involves messaging 703 between the computing device 721 and the SCU 750 and messaging 704 between the EMU 735 and the SCU 750. An authentication 706 at the EMU 706 makes use of exchange of a username and password during the messaging 703, 704. As discussed above, the EMU 735 at the third party site 790 serves as a web portal for access by the users through the SCU 750. The login process includes the EMU 735 providing instructions (not shown) for displaying a GUI at the computing device 721 for the user to input a username and password. Once logged in the user can input instructions and the instructions are sent as a request 707 from the computing device 721 to the SCU 750. The request 707 is relayed from the SCU 750 to the EMU 735 as request 708. The EMU 735 communicates with the database 755 to relay the request 708 in the form of a request 715 to the database 755 where it is stored 720. The database 755 then responds with a reply 725 indicating that the request 715 has been stored. The SCU 750 periodically sends requests 730 for instructions (only one request shown in FIG. 4) to the database 755. Responsive to receiving the request 730, the database 755 fetches 735 instructions that may be present in the database 755 and sends a reply 740 containing the instructions to the SCU 750. In some instances the instructions are intended for a particular one of the network elements 701, 702, which, as discussed above, could be an encryption device, a transport device, or other suitable networking device for example, and the instructions have associated with them an identifier of the particular network element 701, 702. The instructions are then sent in respective instruction messages 745, 746 to the network element or network elements 701, 702 using the identifier for execution 751, 752 of the instructions by the network element or elements 701, 702. The network elements 701, 702 reply to the SCU 750 with reply messages 771, 772, respectively, containing information relating to the instructions sent by the SCU 750. The SCU 750 responds by sending update messages 791, 792 containing the received information to the database 755 for storage 795, 796, respectively, by the database 755.

Figure 9:
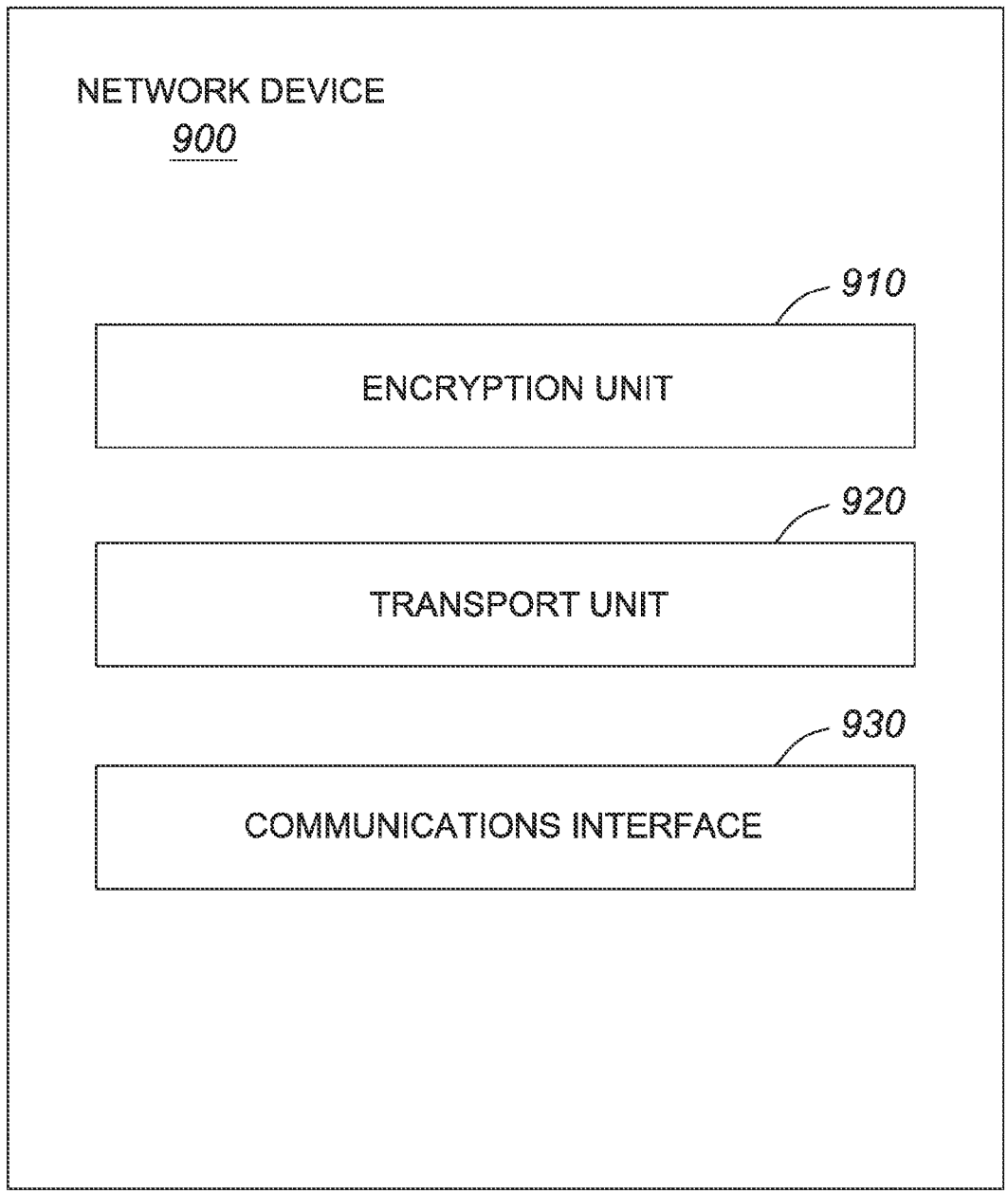
FIG. 9 is a block diagram of a network device having encryption functionality and transport functionality, in accordance with another embodiment.

As discussed above, restricting access by customer users and the network service provider administrators to functions of the encryption devices and transport devices provide some flexibility in how networks can be deployed, particularly with respect to ownership of the network devices such as the encryption devices and transport devices, for example. In addition, restricting access by customer users and the network service provider administrators to functions of encryption devices and transport devices allows functionalities of different network devices to be integrated into a single device while at the same time allowing the customer to maintain control over security of data transmitted over the network. For example, with reference to FIG. 5 in some implementations the functionalities of the encryption devices 231, 232 and the transport device 140, which are owned by the network service provider, are integrated into one device. An exemplary network device 900 integrating encryption functionality and transport functionality is shown in FIG. 9. The network device 900 has an encryption unit 910, a transport unit 920, and a communications interface 930. The communications interface 930 provides the network device 900 with the capability of communicating with other network devices. The encryption unit 910 is used to provide the security functions described above. The transport unit 920 is used to provide the transport functions described above. Although the encryption functions and the transport functions are integrated on the same device a customer's access to the transport functions is restricted to prevent the customer from accessing certain transport functions that are to be accessed only by the network service provider. In addition, the network service provider's access to the encryption functions is restricted to prevent the network service provider from accessing certain encryption functions that are to be accessed only by the customer.

Accessibility to functions by customers and service providers provided by encryption devices and transport devices can be restricted in a number of ways. For example, in some implementations a customer is provided with access to at least some of a number of functions for controlling one or more encryption device, and a network service provider is provided with restricted access to at least one of the functions and access to at least some functions for controlling one or more transport device. In some of these implementations the customer is also provided with restricted access to a subset of the functions for controlling the encryption device(s), the subset of functions being different than the functions for controlling the encryption device(s) accessible by the service provider. In some implementations the customer is provided with restricted access to a subset of the functions for controlling the transport device(s), the function(s) for controlling the transport device(s) accessible by the customer being different than those accessible by the service provider. In some implementations the network service provider is provided with restricted access to a subset of one or more function for controlling the encryption device(s), the function(s) for controlling the encryption device(s) accessible by the service provider being different than those accessible by the customer.

In some implementations a customer is provided with access to at least some functions for controlling one or more encryption device and access to at least one function for controlling one or more transport device. The service provider is provided with access to some functions for controlling one or more transport device.

Figure 10:
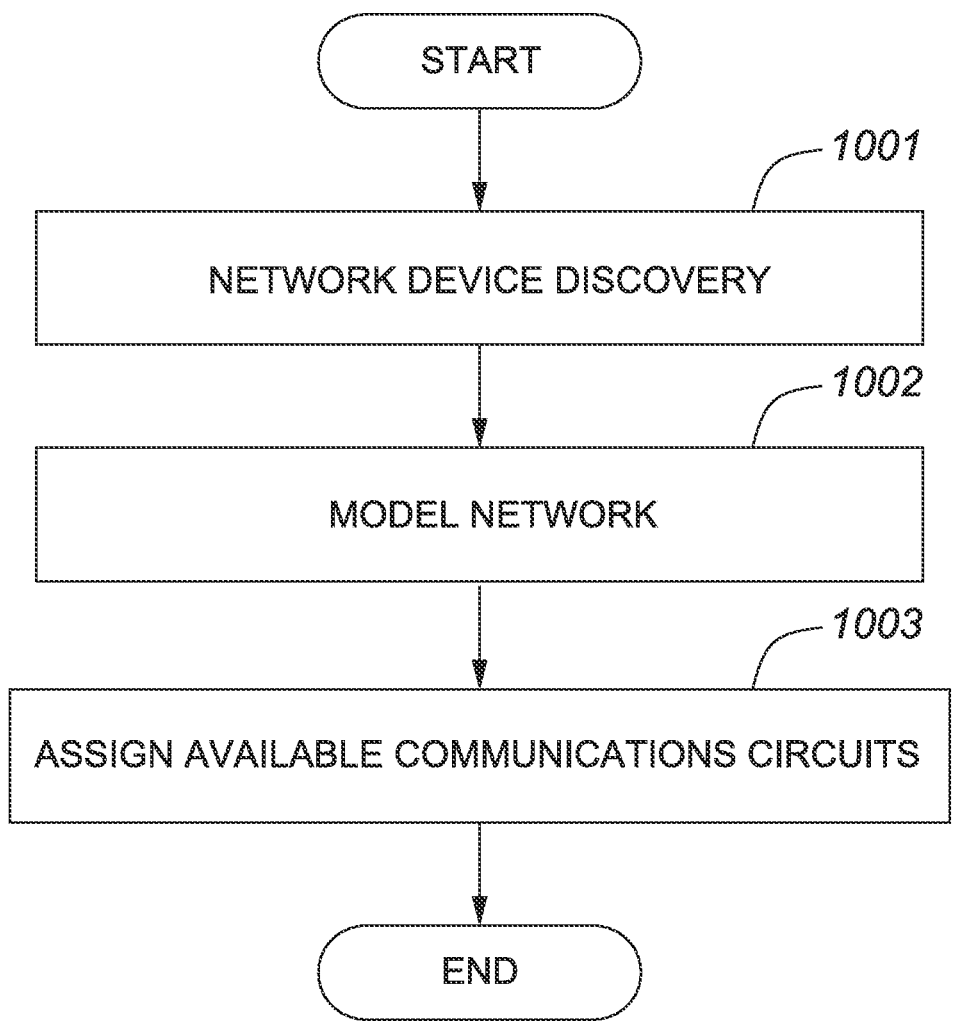
FIG. 10 is flow chart of a method of establishing the network of any one of FIGS. 2A, 2B, 5, 6A, 6B, and 7A.

As discussed above with reference to FIG. 3C, in addition to interfacing with encryption devices and transport devices to provide them with instructions the SCU 360 also performs discovery of network elements, alarm monitoring and performance data collection. In order to perform the above functions a network of network devices needs to be set-up for secure communications. A method of establishing such a network will now be described with reference to FIG. 10. At step 1001 a network device discovery process is performed to determine what network devices are present on the network. With reference to FIG. 2A, a network can include a plurality of network devices at a plurality of customer premises, such as the computing devices 221, 222, the encryption devices 231, 232, the SAN 230, the EMU 235, the transport device 240, the TMU 260, the database 255, and the SCU 250, for example. At step 1002 a model of the network is established. More particularly, a listing of available communications circuits is determined to provide a network topology of the network devices on the network. At step 1003 the network service provider assigns available communications circuits to clients. Once the network topology is known and the communications circuits are assigned the alarm monitoring unit 370 of the SCU 360 can monitor alarms and the performance data collection unit 380 can collect performance data. Step 1001 is performed by the discovery unit 365 of the SCU 360 using well-known techniques for network device discovery. Step 1002 performed by the discovery unit 365 of the SCU 360 of FIG. 3C and the network set-up unit 335 of the TMU 330 of FIG. 3B. With reference to FIG. 3A, an administrator of a network service provider can assign the available communications circuits by accessing transport devices via the second GUI unit 310 of the EMU 300. Instructions for assigning available communications circuits are transmitted as requests 415 as shown in FIG. 4.

Figure 11:
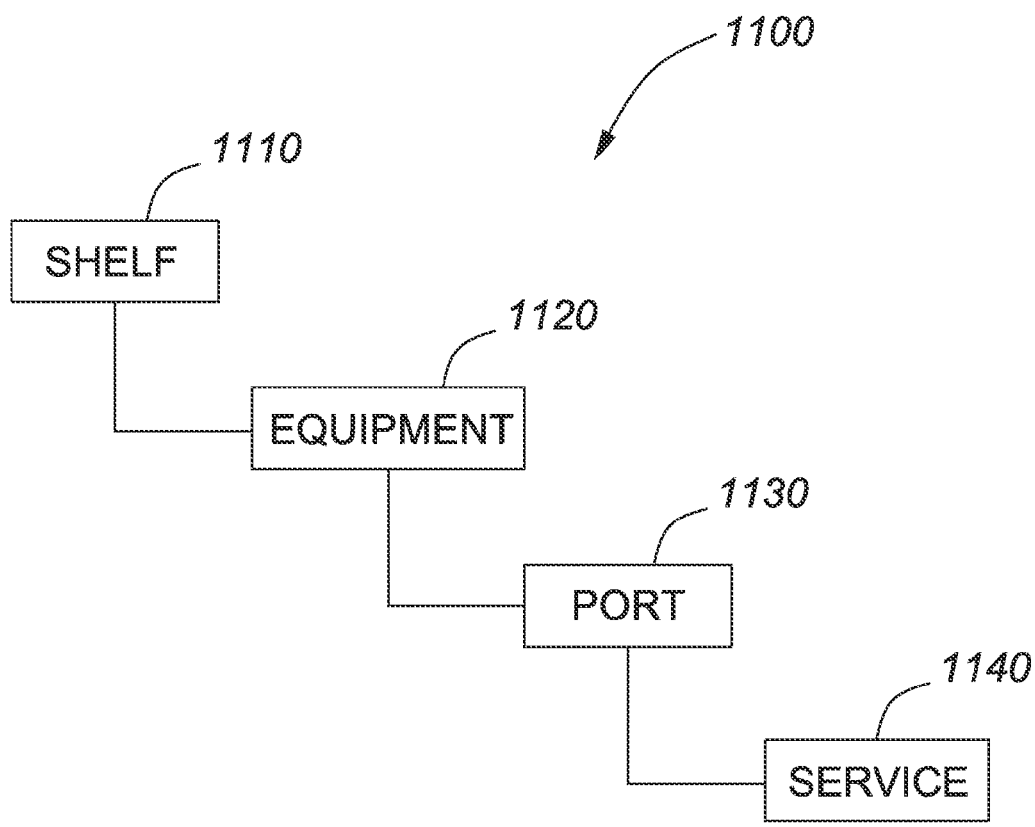
FIG. 11 is an exemplary representation of a communication circuit used for modeling the network of any one of FIGS. 2A, 2B, 5, 6A, 6B, and 7A.
Figure 13:
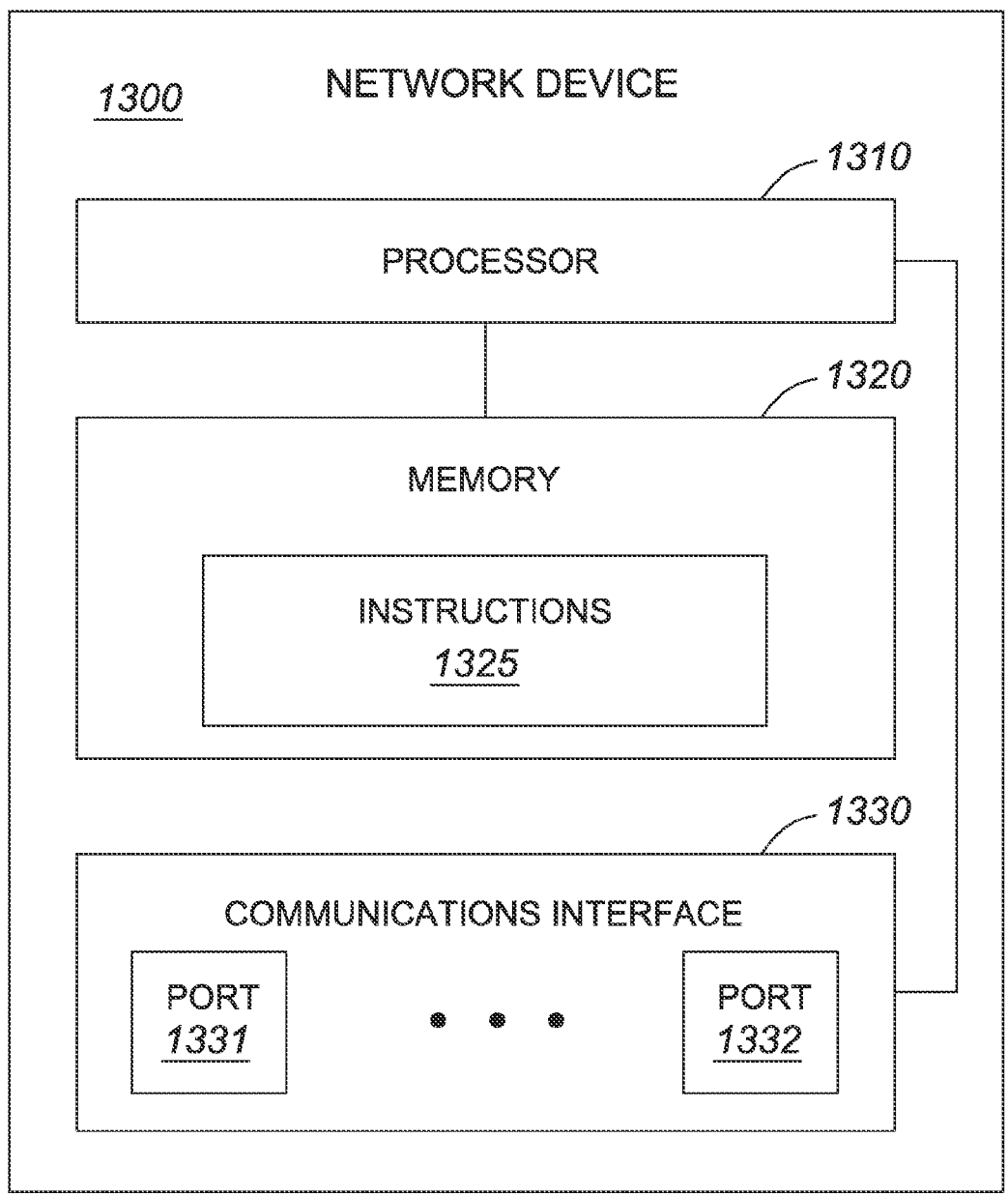
FIG. 13 is block diagram of a network element for use in any of the systems of FIGS. 2A, 2B, 5, 6A, 6B, and 7A.

In some implementations the modeling of a network is established down to a port level. More particularly, a particular node or transport device may have a plurality of slots each having a card for providing transport functionality. Each card has a plurality of ports for communication with other network devices. An exemplary network device 1300 is shown in FIG. 13. The network device 1300 can be any network device in the systems of FIGS. 2A, 2B, 5, 6A, 6B, and 7A, such as the encryption device 131 or the transport device 140 of FIG. 2A for example. The network device 1300 has a processor 1310 and a memory 1320 coupled to the processor 1310. The memory 1320 stores instructions executable by the processor 1310 for providing specific functionality of the network device 1300. The network device 1300 also has a communications interface 1330 coupled to the processor 1310. The communication interface 1330 has a plurality of ports 1331, 1332 (only two shown) that are assignable to entities such as customers and service providers. The network service provider assigns communications circuits at the port level. For example, one more ports, including port 1331, of the network device 1300 may be assigned to the service provider and one or more ports, including port 1332, may be assigned to one or more customers. This allows the network service provider to assign communications circuits of a particular network device to one or more customers. An exemplary representation of a communication circuit, generally indicated by 1100, used for modeling the network is shown in FIG. 11. The communications circuit 1100 is identified in a hierarchical representation by a shelf identifier 1110, an equipment identifier 1120, a port identifier 1130 and a service identifier 1140. In some implementations, ports are also be broken down into flows of data at a VLAN (Virtual Local Area Network), MAC (Media Access Control), or LSP (Label Switched Path) (based on MPLS (Multiprotocol Label Switching)) path level, for example, and in some implementations a communications circuit is also identified by its sub-port. The shelf identifier 1110 identifies a particular node or network device on the network. The equipment identifier 1120 identifies a particular slot or card in the node or shelf. The port identifier 1130 identifies a particular port on the card and the service identifier 1140 identifies a particular service associated with the port. Example services include but are not limited to fiber channel, video link, Ethernet, and IP (Internet Protocol) data.

Figure 12:
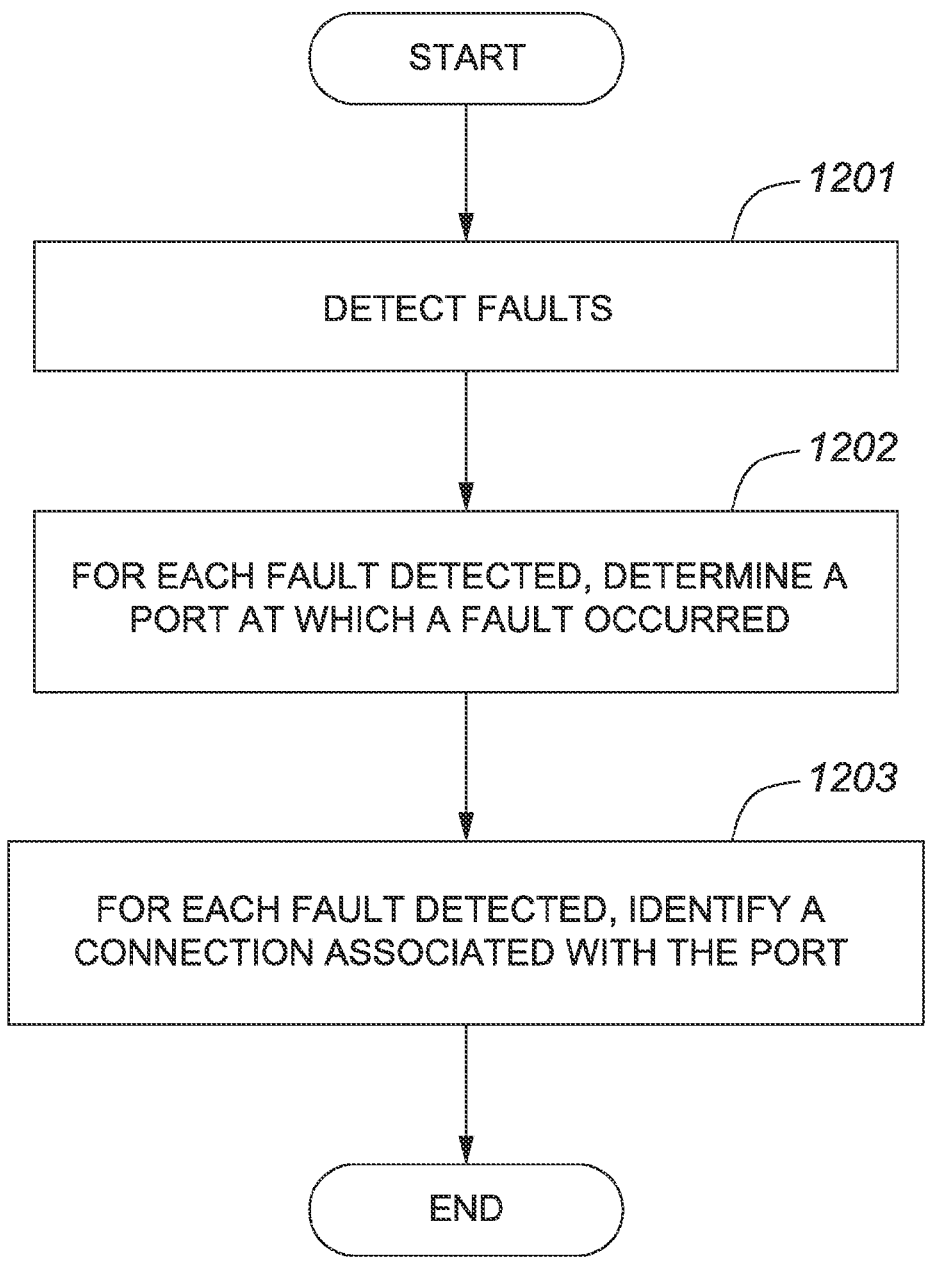
FIG. 12 is a flow chart of a method of monitoring faults, in accordance with another embodiment of the invention.

With reference to FIG. 3B, in some embodiments the fault management unit 340 of the TMU 330 monitors faults that affect communications service provided to customers. The faults are monitored at the port level and this allows the fault management unit 340 to identify one or more connections at a port level responsible for a fault. More particularly, the fault management unit 340 monitors connections between network devices at a port level. The fault management unit 340 identifies faults and for each fault determines which of the connections are responsible for the fault. With reference to FIG. 3A in some implementations the first GUI unit 310 and/or the second GUI unit 315 provide customers and/or network service providers, respectively, with the ability to request a view of faults that have been detected. As discussed above, the faults are presented by identifying the connection or connections responsible for the faults. A method of monitoring faults will now be described with reference to FIG. 12. In FIG. 12, at step 1201 connections are between network devices are monitored at a port level and faults are detected. At step 1002, for each fault a port at which the fault occurred is determined and at step 1203 for each fault a connection associated with the port is identified.

Referring back to FIG. 2A the SCU 250 serves as a proxy for communications between the EMU 235 which is accessed by users and the network devices 401, 402. This prevents the EMU 235 from having direct access to and no direct path to the network devices 401, 402. In some implementations accessibility between the EMU 235 and the network devices 401, 402 can also be further restricted by implementing firewalls at the customer sites 110, 115. Furthermore, with reference to FIG. 13 as discussed above the ports 1331, 1332 of the network device 1300 can be assigned to customers and service providers. In this way access by a customer can be limited to a restricted subset of the ports. In addition, access by a service provider can also be limited to a restricted subset of the ports. With reference to FIGS. 2A and 4, the request 415 received and stored by the database 255 contains instructions for the network devices 401, 402. In some embodiments the instructions are in a format that is suitable for execution on the network elements 401, 402, and an instruction is translated to a device specific command or commands before being sent to the network devices 401, 402. For example, a roll key user request may be translated into 5 to 10 device specific commands. With reference to FIG. 3C, the request service unit 375 translates instructions into device specific commends. In addition, in some embodiments service providers and customers have restricted access to the protocols that are used in accessing the network elements. More specifically, in some implementations a particular customer is given access to only certain protocols. Similarly, in some implementations a particular service provider is given access to only certain protocols, which are different than those accessible by the customer. This is achieved by deploying firewalls at the customer sites 110, 115.

As discussed above, a network device discovery process can be performed to identify network devices present on a network. The network devices include a first subset of network devices owned by a service provider and a second subset of network devices owned by a customer of the service provider, an example of which is shown in FIG. 2A where the customer own the encryption devices 231, 232 and the service provider owns the transport device 240. The network can be modeled to establish a network topology of the network devices on the network with each network device having a respective plurality of ports and the network topology including a plurality of connections between the network devices. As discussed above, one or more ports of the first subset of network devices owned by the service provider can be assigned to the customer and one or more ports of the second subset of network devices owned by the customer of the service provider can be assigned to the service provider. This allows connections to be established between a network device owned by the customer and a network device owned by the service provider. With reference to FIG. 3C, the performance data collection unit 380 monitors the performance of the plurality of the connections. As discussed above, different types of network elements can be coupled to the connections. For example, network elements owned by the service provider may monitor the state of some or all data handled by the devices including inventory and fault data, for example. The monitoring can be implemented internally within the devices or by one or more other devices, and with reference to FIG. 3C state information is provided to the performance data collection unit 380. In some instances the network elements do not have the capability of monitoring state information and the performance data collection unit 380 performs monitoring of state information for those network elements.

Figure 14A:
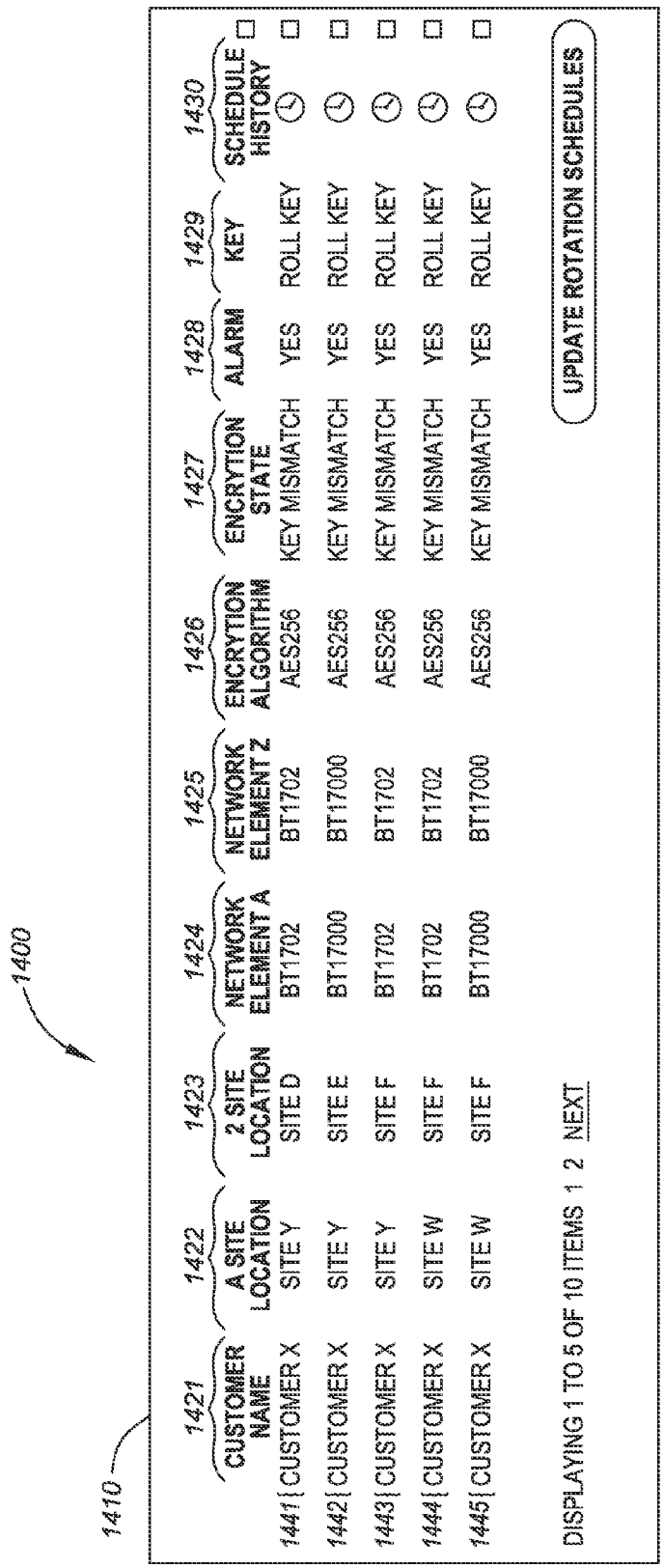
FIG. 14A is a view of an image with information related to any one of the systems of FIGS. 2A, 2B, 5, 6A, 6B, and 7A and displayed on a user's screen.
Figure 14B:
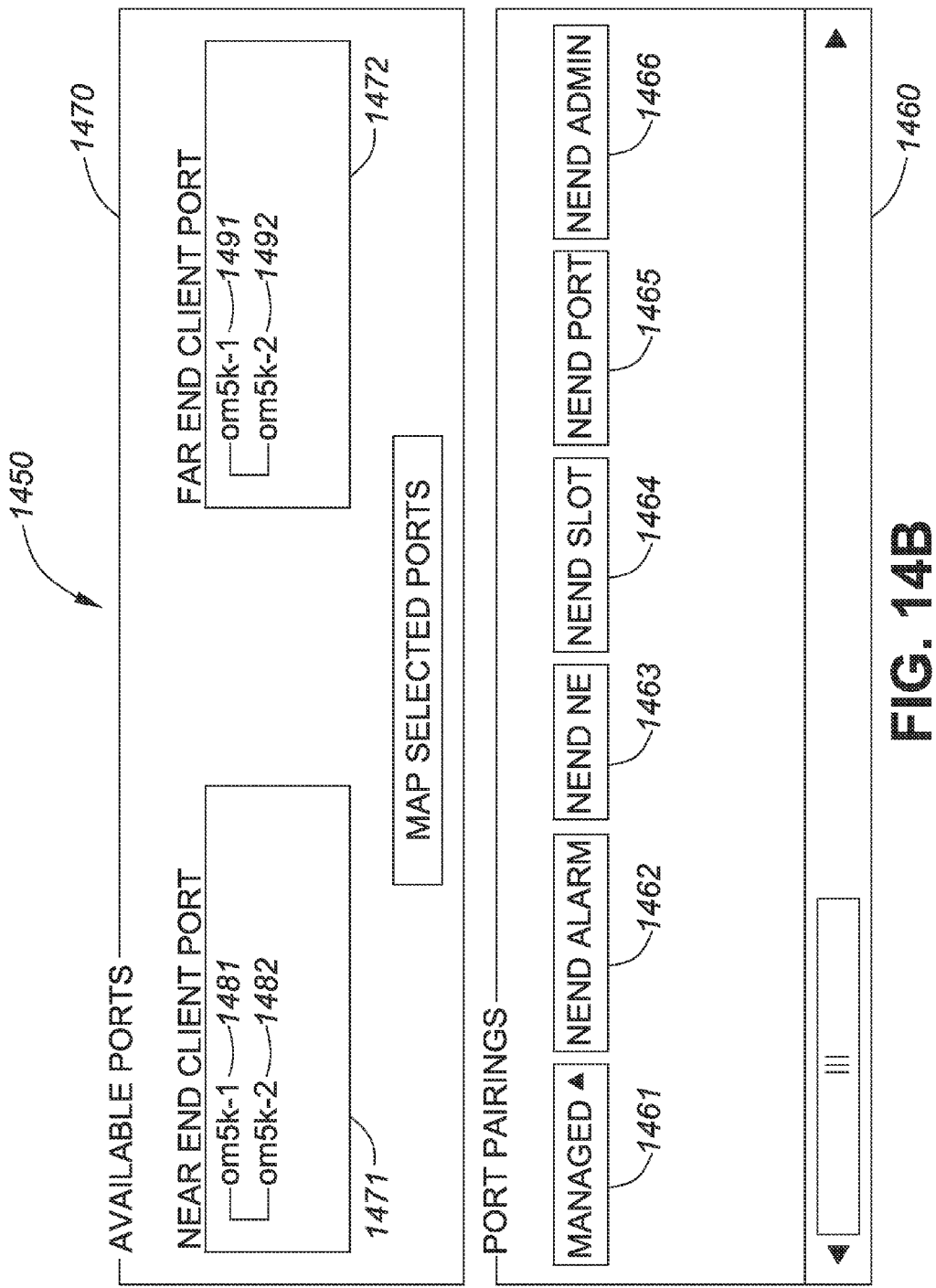
FIG. 14B is another view of an image with information related to any one of the systems of FIGS. 2A, 2B, 5, 6A, 6B, and 7A and displayed on a user's screen.

With reference to FIG. 3A, the first GUI unit 305 provides a GUI for displaying network topology and status information for all network elements a particular customer has access to. An exemplary output 1400 of the GUI presented to a customer user is shown in FIG. 14A. The output 1400 includes information and selectable links presented in a table 1410. The information is arranged in columns 1421, 1422, 1423, 1424, 1425, 1426, 1427, 1428, 1429, and 1430 and arranged in rows 1441, 1442, 1443, 1444, and 1445. Column 1440 contains an identifier of the customer. For each row, column 1422 contains an identification of the site at which a first one of the network elements coupled to the respective connection is located and column 1423 contains an identification of the site at which a second one of the network elements coupled to the respective connection is located. Columns 1424 and 1425 contain an identification of the first and second network elements, respectively. Column 1426 contains identifiers of the encryption algorithms that are monitored, and columns 1427, 1428 contain information on the encryption states of the encryption algorithms. Column 1429 provides selectable links to key roll functions and column 1430 provides selectable links to schedule histories for rotating encryption keys. The network topology and state information shown in FIG. 14A is shown as examples only and it is to be clearly understood that there are other network topology and state information that can be displayed. For example, in some implementations the output 1400 includes any one or more of fault, performance, status, transport, and security information. An exemplary output 1450 of the GUI presented to a service provider is shown in FIG. 14B. The output 1450 has a window 1460 containing user selectable icons 1461, 1462, 1463, 1464, 1465, 1466 for selecting the type of information to be displayed. Only six icons are shown. However, it is to be clearly understood that any suitable number of icons can be displayed. The information is displayed in a window 1470. In FIG. 14A, the icon 1461 is selected and information on port pairings is displayed in the window 1470. More particularly, within window 1470 are windows 1471 and 1472 each containing port identifiers associated with connections. The window 1471 include identifiers 1481, 1482 of ports at a first end, referred to as a near end, of the connections and the window 1472 include identifiers 1491, 1492 of ports at a second end, referred to as a far end, of the connections. The information displayed in window 1470 is exemplary only and a user can select the specific information to be displayed by selecting an appropriate one of the user selectable icons 1461, 1462, 1463, 1464, 1465, 1466.

The embodiments presented are exemplary only and persons skilled in the art would appreciate that variations to the embodiments described above may be made without departing from the spirit of the present disclosure. The scope is solely defined by the appended claims.

We claim:

1. In a system comprising at least one encryption device and at least one transport device, a method of controlling access to a first plurality of functions of the at least one encryption device and access to a second plurality of functions of the at least one transport device, the first plurality of functions comprising a function for controlling security of customer data transmitted across a network, the method comprising:
providing a customer with access to at least some functions of the first plurality of functions, the at least some of the first plurality of functions comprising said function for controlling security of customer data transmitted across a network;
providing a network service provider with restricted access to a subset of the first plurality of functions, the subset of the first plurality of functions comprising at least one of the first plurality of functions and excluding said function for controlling security of customer data transmitted across a network; and,
providing the network service provider with access to at least some functions of the second plurality of functions,
wherein the providing a customer with access to at least some functions of the first plurality of functions comprises:
responsive to receiving first requests from users of the customer, providing first instructions intended for the at least one encryption device for controlling access to the at least some functions of the first plurality of functions;
wherein the providing a network service provider with restricted access to a subset of the first plurality of functions comprises:
responsive to receiving second request from users of the network service provider, providing second instructions intended for that at least one encryption device for controlling access to the subset of the first plurality of functions; and,
wherein the providing the network service provider with access to at least dome functions of the second plurality of functions comprises:
responsive to receiving third request from the users of the network service provider, providing third instruction intended for the at least one transport device for controlling access to the at least some functions of the second plurality of functions.

2. A method according to claim 1 wherein the providing a customer with access to at least some of the first plurality of functions comprises providing the customer with restricted access to an other subset of the first plurality of functions, the other subset of the first plurality of functions comprising fewer than all of the first plurality of functions.

3. A method according to claim 2 wherein said other subset of the first plurality of functions is different than said subset of the first plurality of functions.

4. A method according to claim 1 comprising:
providing the customer with restricted access to at least one of the second plurality of functions.

5. A method according to claim 4 wherein the providing the network service provider with access to at least some of the second plurality of functions comprises providing the network service provider with restricted access to an other subset of the second plurality of functions, the other subset of the second plurality of functions comprising fewer than all of the second plurality of functions.

6. A method according to claim 5 wherein said other subset of the second plurality of functions forms a first subset of the second plurality of functions and the at least one of the second plurality of functions forms a second subset of the second plurality of functions, the first subset and the second subset being different subsets.

7. A method according to claim 1 comprising:
maintaining a database of user credentials of users of the service provider;
conducting user authentication by comparing received user credentials with the user credentials of the users of the service provider in the database; and,
providing the users of the service provider with restricted access to said subset of the first plurality of functions based on said authentication.

8. A method according to claim 1 wherein the customer and the service provider collectively own network elements, the network elements comprising the at least one encryption device and the at least one transport device and the method comprising:
using a proxy to service user instructions from the customer and the service provider for accessing the first plurality of functions and the second plurality of functions, the proxy having limited access to the network elements.

9. A method according to claim 8 comprising:
limiting available protocols for use in accessing the network elements by the service provider and the customer.

10. A method according to claim 8 wherein each of the at least one transport device comprises a plurality of ports, the method comprising:
limiting access by the customer to a restricted subset of the plurality of ports, the restricted subset of the plurality of ports comprising fewer than all of the plurality of ports.

11. A method according to claim 8 wherein each of the at least one encryption device comprises a plurality of ports, the method comprising:
limiting access by the service provider to a restricted subset of the plurality of ports, the restricted subset of the plurality of ports comprising fewer than all of the plurality of ports.

12. A method according to claim 8 wherein the network elements collectively comprise a plurality of ports, the method comprising:
- storing the user instructions from the customer and the service provider in a database, each user instruction being intended for a respective network element of the network elements;
- limiting access by the customer and the service provider to a respective subset of the plurality of ports, each respective subset comprising fewer than all of the plurality of ports;
- accessing the user instructions from the database; and,
- servicing the user instructions by sending the instructions over encrypted communications paths to the respective network elements.

13. A method according to claim 12 wherein the servicing the user instructions comprises converting the user instructions to a format for execution by the respective network elements.

14. A method according to claim 1 wherein the network comprises a topology having a plurality of point-to-point connections comprising respective two end points, the method comprising:
- transmitting the customer data across the network through the point-to-point connections.

15. A method according to claim 14 comprising decrypting the customer data, said decrypting being controlled by the customer.

16. A method according to claim 14 wherein for each point-to-point connection the respective two end points each comprise encryption functionality and encryption management functionality implemented in a single device.

17. A method according to claim 14 comprising:
- providing a key roll function of encryption keys for each point to point connection.

18. In a system comprising at least one encryption device and at least one transport device, a method of controlling access to a first plurality of functions of the at least one encryption device and access to a second plurality of functions of the at least one transport device, the second plurality of functions comprising a transport function necessary for providing network service offered by a network service provider, the method comprising:
- providing a customer with access to at least some functions of the first plurality of functions;
- providing the customer with access to a subset of the second plurality of functions, the subset of the second plurality of functions comprising at least one of the second plurality of functions and excluding said transport function necessary for providing network service offered by a network service provider; and,
- providing a network service provider with access to at least some functions of the second plurality of functions, the at least some functions of the second plurality of functions comprising said transport function necessary for providing network service offered by a network service provider,
- wherein the providing a customer with access to at least some functions of the first plurality of functions comprises:
- responsive to receiving first request from users of the customer, providing first instructions intended for the at least one encryption device for controlling access to the at least some functions of the first plurality of functions;
- wherein the providing the customer with access to a subset of the second plurality of functions comprises;
- responsive to receiving second request from the users of the customer, providing second instructions intended for the at least one transport device for controlling access to the subset of the second plurality of functions; and,
- wherein the providing a network service provider with access to at least some of the second plurality of functions comprises:
- responsive to receiving third requests from users of the network service provider, providing third instructions intended for the at least one transport device for controlling access to the at least some functions of the second plurality of functions.

19. A method according to claim 18 comprising:
- maintaining a database of user credentials of users of the customer;
- conducting user authentication by comparing received user credentials with the user credentials of the users of the customer in the database; and,
- providing the users of the customer with restricted access to said subset of the second plurality of functions based on said authentication.

20. A network device for controlling access to a first plurality of functions of at least one encryption device and access to a second plurality functions of at least one transport device, the first plurality of functions comprising a function for controlling security of customer data transmitted across a network, the network device comprising:
- an encryption management unit for, responsive to receiving first requests from the users of a customer, providing first instructions intended for the at least one encryption device for controlling access to at least some functions of the first plurality of functions, the at least some of the first plurality of functions comprising said function for controlling security of customer data transmitted across a network and, responsive to receiving second requests from users of a network service provider, providing second instructions intended for the at least one encryption device for controlling access a subset of the first plurality of functions, the subset comprising at least one of the first plurality of functions and excluding said function for controlling security of customer data transmitted across a network; and,
- a transport management unit for, responsive to receiving third requests from the users of the network service provider, providing third instructions intended for the at least one transport device for controlling access to at least some functions of the second plurality of functions; and,
- a communications interface for receiving the first requests, the second requests, and the third requests and for transmitting the first instructions, the second instructions, and the third instructions.

21. A network device according to claim 20 comprising:
- a database for maintaining user credentials of the users of the service provider; and
- an authentication unit for conducting a user authentication by comparing user credentials received through the communications interface with the user credentials of the users of the service provider in the database and for providing the users of the service provider with restricted access to said subset of the first plurality of functions based on said user authentication.

22. A network device according to claim 20 comprising:
- a GUI (Graphical Interface) unit for providing a GUI to the network service provider, the GUI providing the users of the service provider with an interface for providing instructions for accessing the subset of the first plurality of functions.

23. A network device for controlling access to a first plurality of functions of at least one encryption device and access to a second plurality functions of at least one transport device, the second plurality functions comprising a transport function necessary for providing network service offered by a network service provider, the network device comprising:
- an encryption management unit for, responsive to receiving first requests from users of a customer, providing first instructions intended for the at least one encryption device for controlling access to at least some functions of the first plurality of functions; and,
- a transport management unit for, responsive to receiving second requests from users of the network service provider, providing second instructions intended for the at least one transport device for controlling access to at least some of the second plurality of functions, the at least some of the second plurality of functions comprising said transport function necessary for providing network service offered by a network service provider and,
- responsive to receiving third requests from the users of the customer, providing third instructions intended for the at least one transport device for controlling access to a subset of the second plurality of functions, the subset comprising at least one of the second plurality of functions and excluding said transport function necessary for providing network service offered by a network service provider; and,
- a communications interface for receiving the first requests, the second requests, and the third requests and for transmitting the first instructions, the second instructions, and the third instructions.

24. A network device according to claim 23 comprising:
- a database for maintaining user credentials of the users of the customer; and
- an authentication unit for conducting a user authentication by comparing user credentials received through the communications interface with the user credentials of the users of the customer in the database and for providing the users of the customer with restricted access to said subset of the second plurality of functions based on said user authentication.

25. A network system according to claim 23 comprising:
- a GUI (Graphical Interface) unit for providing a GUI to the customer, the GUI providing the users of the customer with an interface for providing instructions for accessing the subset of the second plurality of functions.

26. An article of manufacture comprising:
- a non-transitory computer usable medium having computer readable program code means embodied therein for controlling access to a first plurality of functions of at least one encryption device and access to a second plurality of functions of at least one transport device, the first plurality of functions comprising a function for controlling security of customer data transmitted across a network, the computer readable code means in said article of manufacture comprising:
- computer readable code means for providing a customer with access to at least some functions of the first plurality of functions;
- computer readable code means for providing a network service provider with restricted access to a subset of the first plurality of functions, the subset of the first plurality of functions comprising at least one of the first plurality of functions and excluding said function for controlling security of customer data transmitted across a network; and,
- computer readable code means for providing the network service provider with access to at least some functions of the second plurality of functions, the at least some functions of the second plurality of functions comprising said function for controlling security of customer data transmitted across a network,
- wherein the providing a customer with access to at least some functions of the first plurality of functions comprises:
- responsive to receiving first requests from users of the customer, providing first instructions intended for the at least one encryption device for controlling access to the at least some functions of the first plurality of functions;
- wherein the providing a network service provider with restricted access to a subset of the first plurality of functions comprises:
- responsive to receiving second requests from users of the network service provider, providing second instructions intended for the at least one encryption device for controlling access to the subset of the first plurality of functions; and,
- wherein the providing the network service provider with access to at least some of the second plurality of functions, comprises:
- responsive to receiving third requests from the users of the network service provider, providing third instructions intended for the at least one transport device for controlling access to the at least some functions of the second plurality of functions.

* * * * *